United States Patent
Pyo et al.

(10) Patent No.: US 8,165,437 B2
(45) Date of Patent: Apr. 24, 2012

(54) SEMICONDUCTOR INTEGRATED CIRCUITS INCLUDING GRATING COUPLER FOR OPTICAL COMMUNICATION AND METHODS OF FORMING THE SAME

(75) Inventors: Jung-Hyung Pyo, Seoul (KR); O-Kyun Kwon, Daejeon (KR); Gyung-Ock Kim, Seoul (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 154 days.

(21) Appl. No.: 12/684,677

(22) Filed: Jan. 8, 2010

(65) Prior Publication Data

US 2010/0111469 A1 May 6, 2010

Related U.S. Application Data

(62) Division of application No. 12/117,708, filed on May 8, 2008, now abandoned.

(30) Foreign Application Priority Data

Dec. 17, 2007 (KR) ........................ 10-2007-0132341

(51) Int. Cl.
G02B 6/34 (2006.01)
G02B 6/42 (2006.01)
(52) U.S. Cl. .......................................... 385/37; 385/18
(58) Field of Classification Search .................... 385/37, 385/18
See application file for complete search history.

(56) References Cited

U.S. PATENT DOCUMENTS

| | | | | |
|---|---|---|---|---|
| 4,914,667 A | * | 4/1990 | Blonder et al. ............. 372/44.01 |
| 5,581,643 A | * | 12/1996 | Wu ................................ 385/17 |
| 5,673,284 A | * | 9/1997 | Congdon et al. ............. 372/50.1 |
| 6,064,783 A | * | 5/2000 | Congdon et al. ................ 385/15 |
| 6,212,216 B1 | * | 4/2001 | Pillai ............................... 372/96 |
| 6,282,219 B1 | * | 8/2001 | Butler et al. .................. 372/50.1 |
| 6,487,328 B2 | * | 11/2002 | Butler et al. ..................... 385/14 |
| 6,845,184 B1 | * | 1/2005 | Yoshimura et al. ............. 385/14 |
| 6,944,192 B2 | * | 9/2005 | Prassas et al. ..................... 372/6 |
| 7,065,271 B2 | * | 6/2006 | Zheng et al. ..................... 385/37 |
| 7,184,625 B2 | * | 2/2007 | Gunn et al. ...................... 385/37 |
| 7,184,627 B1 | * | 2/2007 | Gunn et al. ...................... 385/37 |
| 7,323,677 B1 | * | 1/2008 | Wang ........................ 250/227.14 |
| 7,330,612 B2 | * | 2/2008 | Nakashiba et al. ............. 385/14 |
| 7,535,944 B1 | * | 5/2009 | Guilfoyle et al. ........... 372/50.11 |
| 7,923,273 B2 | * | 4/2011 | Dutta ............................... 438/29 |
| 2001/0012423 A1 | * | 8/2001 | Butler et al. .................... 385/14 |
| 2002/0097962 A1 | * | 7/2002 | Yoshimura et al. ............. 385/50 |
| 2003/0063629 A1 | * | 4/2003 | Davis et al. ........................ 372/6 |
| 2004/0156589 A1 | * | 8/2004 | Gunn et al. ...................... 385/37 |
| 2005/0141808 A1 | * | 6/2005 | Cheben et al. ................... 385/31 |
| 2005/0207464 A1 | * | 9/2005 | Blauvelt et al. ................. 372/64 |
| 2005/0224946 A1 | * | 10/2005 | Dutta ............................. 257/686 |
| 2005/0238278 A1 | * | 10/2005 | Nakashiba et al. ............. 385/14 |
| 2008/0113168 A1 | * | 5/2008 | Nakashiba et al. ........... 428/212 |
| 2010/0027577 A1 | * | 2/2010 | Dutta ........................... 372/50.1 |
| 2010/0027946 A1 | * | 2/2010 | Dutta ............................... 385/88 |
| 2010/0027947 A1 | * | 2/2010 | Dutta ............................... 385/88 |
| 2010/0091293 A1 | * | 4/2010 | Shani ............................ 356/477 |

* cited by examiner

Primary Examiner — K. Cyrus Kianni

(57) ABSTRACT

Provided are semiconductor integrated circuits including a grating coupler for optical communication and methods of forming the same. The semiconductor integrated circuit includes: a cladding layer disposed on a semiconductor substrate; a grating coupler including an optical waveguide on the cladding layer and a grating on the optical waveguide; and at least one reflector formed in the cladding layer below the grating.

3 Claims, 22 Drawing Sheets

SEMICONDUCTOR INTEGRATED CIRCUITS INCLUDING GRATING COUPLER FOR OPTICAL COMMUNICATION AND METHODS OF FORMING THE SAME

CROSS-REFERENCE TO RELATED APPLICATIONS

This U.S. non-provisional patent application claims priority under 35 U.S.C. §119 of Korean Patent Application No. 10-2007-0132341, filed on Dec. 17, 2007, the entire contents of which are hereby incorporated by reference.

BACKGROUND OF THE INVENTION

The present invention disclosed herein relates to a semiconductor integrated circuit and a method of forming the same, and more particularly, to a semiconductor integrated circuit including a grating coupler for optical communication and a method of forming the same.

The present invention has been derived from a research undertaken as a part of the information technology (IT) R & D of Ministry of Information and Communication and Institution for Information Technology Association (MIC/IITA) [2006-S-004-02], silicon based high speed optical interconnection IC.

Recently, technology of a semiconductor integrated circuit has been remarkably developed. Accordingly, the semiconductor integrated circuit becomes faster, lighter, and more highly integrated. These semiconductor integrated circuits can be connected to each other through an electrical signal. However, communication speed between semiconductor integrated circuits or semiconductor integrated circuits and other electronic medium reaches the limitations due to high electrical resistance when semiconductor integrated circuits are connected through electrical signals.

To resolve the above limitations, research for optical communication and/or optical interconnection has been aggressively under development. That is, undertaken actively is research for replacing signals with optical signals between semiconductor integrated circuits, semiconductor integrated circuits and other electronic medium, or small-scale element groups in semiconductor integrated circuits.

As one device for optical communication and/or optical interconnection, a grating coupler was suggested before. The grating coupler couples an optical signal between an optical fiber and a semiconductor integrated circuit. However, this grating coupler has a low optical coupling efficiency, thereby causing massive optical losses.

SUMMARY OF THE INVENTION

The present invention provides a semiconductor integrated circuit including a grating coupler optimized for optical communication and a method of forming the same.

The present invention also provides a semiconductor integrated circuit including a grating coupler with an excellent coupling efficiency and a method of forming the same.

Embodiments of the present invention provide semiconductor integrated circuits. The semiconductor integrated circuit may include: a cladding layer disposed on a semiconductor substrate; a grating coupler including an optical waveguide on the cladding layer and a grating on the optical waveguide; and at least one reflector formed in the cladding layer below the grating.

In some embodiments, the reflector may include a plane form parallel to the top surface of the semiconductor substrate.

In other embodiments, a plurality of the reflectors may be disposed in the cladding layer, the reflectors being sequentially stacked and spaced apart from each other in a direction perpendicular to the top surface of the semiconductor substrate.

In still other embodiments, the reflector may include a reflective surface non-parallel to the top surface of the semiconductor substrate.

In even other embodiments, the reflector may include a reflective surface oblique with respect to the top surface of the semiconductor substrate.

In yet other embodiments, a plurality of the reflectors may be disposed in the cladding layer, the plurality of reflectors being arranged along one direction at the same height.

In further embodiments, the thickness of the reflector may increase as a position in the reflector moves laterally from a first sidewall of the reflector toward a second sidewall of the reflector.

In still further embodiments, the reflector may include a grating shape.

In even further embodiments, the grating may include a plurality of protrusions spaced apart from each other side by side, each of the protrusions having both sidewalls oblique to the top surface of the semiconductor substrate.

In other embodiments of the present invention, a semiconductor integrated circuit may include: a cladding layer disposed on a semiconductor substrate; a grating coupler including an optical waveguide on the cladding layer and a grating on the optical waveguide; and at least one reflector formed in the semiconductor substrate below the grating and including a reflective surface non-parallel to the top surface of the semiconductor substrate.

In some embodiments, the reflector may include a reflective surface oblique with respect to the top surface of the semiconductor substrate.

In other embodiments, a plurality of the reflectors may be disposed in the semiconductor substrate, the reflectors being arranged along one direction parallel to the top surface of the semiconductor substrate at the same height.

In still other embodiments, the thickness of the reflector may increase as a position in the reflector moves laterally from a first sidewall of the reflector toward a second sidewall of the reflector.

In even other embodiments, the reflector may include a grating shape.

In yet other embodiments, the grating may include a plurality of protrusions spaced apart from each other side by side, each of the protrusions having both sidewalls oblique to the top surface of the semiconductor substrate.

In further embodiments, the semiconductor integrated circuit may further include a low refractive-index material filling a region where the cladding layer below the grating is removed, the low refractive-index material having a lower refllactive-index than the semiconductor substrate.

In still other embodiments of the present invention, methods of forming a semiconductor integrated circuit may include: preparing a substrate including a semiconductor substrate, a cladding layer, and a semiconductor layer, which are sequentially stacked; forming at least one reflector in the substrate using an element ion implantation process; and patterning the semiconductor layer to form a grating coupler, the grating coupler including an optical waveguide on the cladding layer and a grating on the optical waveguide. The reflector is formed below the grating.

In some embodiments, the reflector may be formed in the cladding layer.

In other embodiments, the reflector may be formed in the semiconductor substrate.

In still other embodiments, the forming of the reflector may further include performing an annealing process on the substrate after performing the element ion implantation process.

In even other embodiments, the forming of the reflector may include:

forming a mask pattern having an opening on the substrate; and performing an element ion implantation process by using the mask pattern as an ion implantation mask. The reflector is formed in a plane shape parallel to the top surface of the semiconductor substrate.

In yet other embodiments, the forming of the reflector may include sequentially performing a plurality of element ion implantation processes having different implantation energies from each other by using the mask pattern as a mask. A plurality of plane-shaped reflectors sequentially stacked are formed in the substrate, and are spaced apart from each other in a direction perpendicular to the top surface of the semiconductor substrate.

In further embodiments, the reflector may include a reflective surface non-parallel with respect to the top surface of the semiconductor substrate.

In still further embodiments, the forming of the reflector may include sequentially performing a plurality of selective element ion implantation processes having different implantation energies from each other to form a plurality of element implantation regions. The element implantation regions have the same width, and a virtual line via the centers of the element implantation regions is oblique with respect to the top surface of the semiconductor substrate.

In even further embodiments, the forming of the reflector may include sequentially performing a plurality of selective element ion implantation processes having different implantation energies from each other to form a plurality of element implantation regions. Widths of the element implantation regions are different from each other, the widths of the stacked element implantation regions decrease from the lowermost element implantation region toward the uppermost element implantation region, and one sidewalls of the stacked element implantation regions are aligned to each other.

In yet further embodiments, the forming of the reflector may include: performing a first element ion implantation process in the substrate to form a first element implantation region being plane-shaped; and selectively performing a second element ion implantation process in the substrate to form a plurality of second element implantation regions on the first element implantation region. The second element implantation regions have the less widths than the first element implantation region; the second element implantation regions contact the first ion implantation layer; and the second element implantation regions are spaced apart from each other side by side.

In yet further embodiments, the method may further include: removing the cladding layer below the grating coupler; and filing a region where the cladding layer is removed with a low refractive-index material. The reflector is formed in the semiconductor substrate below the grating coupler.

In even other embodiments of the present invention, a method of forming a semiconductor integrated circuit may include: preparing a substrate including a semiconductor substrate, a cladding layer, and a semiconductor layer, which are sequentially stacked; forming compound patterns on an upper portion of the semiconductor layer using an ion implantation process, the compound patterns being laterally spaced apart from each other and having oblique both sidewalls; and patterning the semiconductor layer to form a grating coupler, the grating coupler including an optical waveguide on the cladding layer and a grating on the optical waveguide. A protruding portion of the grating is a portion of the semiconductor layer between the compound patterns.

In some embodiments, the forming of the compound pattern may include performing a plurality of selective ion implantation processes having respectively different implantation energies to form a plurality of compound element implantation regions. The compound element implantation regions have the same width, and a virtual line via the centers of the compound element implantation regions is oblique with respect to the top surface of the semiconductor substrate.

In other embodiments, the forming of the compound pattern further may include performing an annealing process on the substrate after the ion implantation process.

In still other embodiments, the method may further include forming at least one reflector in the substrate below the grating using an element ion implantation process.

In even other embodiments, the reflector may be formed in the cladding layer below the grating.

In yet other embodiments, the reflector may be formed in the semiconductor substrate below the grating coupler.

According to the present invention, at least one reflector is formed below a grating through an ion implantation process. Accordingly, a portion of an optical signal that is transmitted below an optical waveguide is reflected toward the optical wave guide by the reflector. Accordingly, an optical coupling efficiency of a semiconductor integrated circuit is improved.

Moreover, sidewalls of protrusions at a grating are diagonally formed using a chemical compound pattern formed through an ion implantation process. Therefore, an optical coupling efficiency of a grating coupler is improved.

BRIEF DESCRIPTION OF THE FIGURES

The accompanying figures are included to provide a further understanding of the present invention, and are incorporated in and constitute a part of this specification. The drawings illustrate exemplary embodiments of the present invention and, together with the description, serve to explain principles of the present invention. In the figures.

DETAILED DESCRIPTION OF PREFERRED EMBODIMENTS

Figure 1:
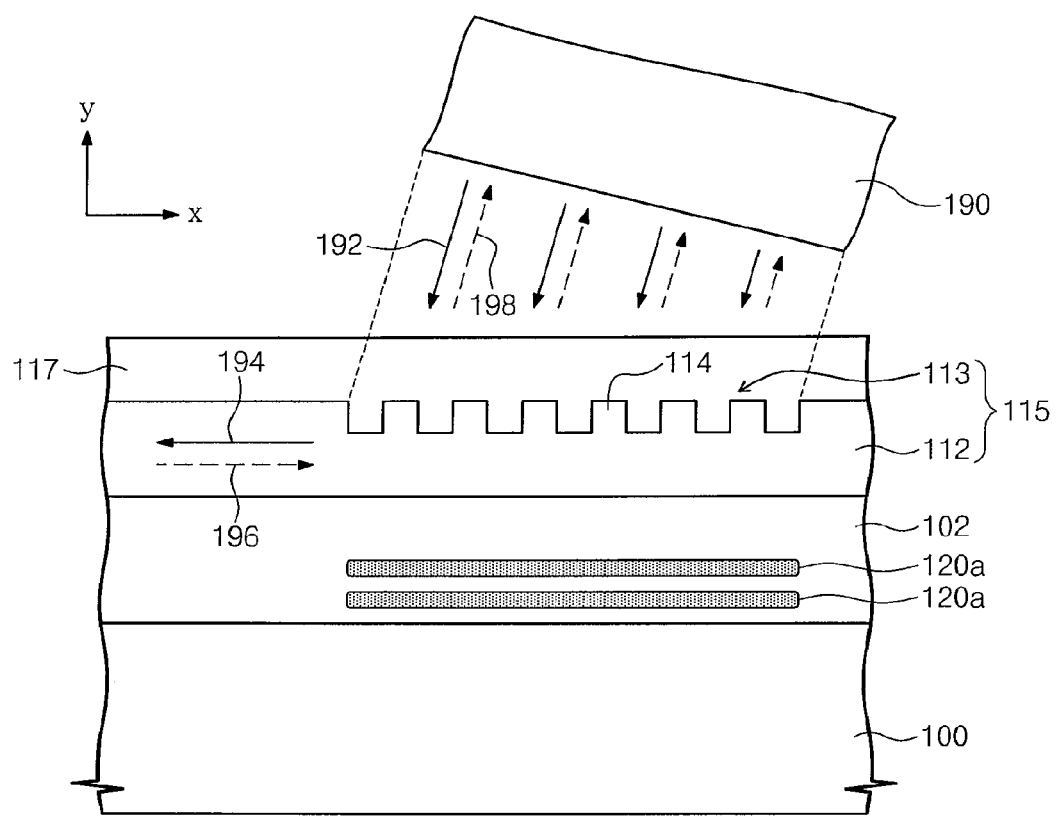
FIG. 1 is a sectional view of a semiconductor integrated circuit including a grating coupler according to one embodiment of the present invention.

Preferred embodiments of the present invention will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. In the figures, the dimensions of layers and regions are exaggerated for clarity of illustration. It will also be understood that when a layer (or film) is referred to as being 'on' another layer or substrate, it can be directly on the other layer or substrate, or intervening layers may also be present. Further, it will be understood that when a layer is referred to as being 'under' another layer, it can be directly under, and one or more intervening layers may also be present. In addition, it will also be understood that when a layer is referred to as being 'between' two layers, it can be the only layer between the two layers, or one or more intervening layers may also be present. Like reference numerals refer to like elements throughout.

First Embodiment

FIG. 1 is a sectional view of a semiconductor integrated circuit including a grating coupler according to one embodiment of the present invention.

Referring to FIG. 1, a cladding layer 102 is disposed on a semiconductor substrate 100. A grating coupler 115 is disposed on the cladding layer 102. The grating coupler 115 includes an optical waveguide 112 on the cladding layer 102 and a grating 113 on the optical waveguide 112. The optical waveguide 112 extends along one direction parallel to the top surface of the semiconductor substrate 100. The one direction corresponds to an x-axis direction of FIG. 1. A y-axis direction of FIG. 1 corresponds to a direction vertical to the top surface of the semiconductor substrate 100. The grating 113 includes a plurality of protrusions 114 spaced apart from each other in the one direction. The grating 113 is formed by the spaced protrusions 114. Both sidewalls of the protrusions 114 may be vertical to the top surface of the semiconductor substrate 100. However, the present invention is not limited thereto. The sidewalls of the protrusions 114 may have a different form. For example, the both sidewalls of the protrusions 114 may be oblique with respect to the top surface of the semiconductor substrate 100. The grating 113 is disposed on a portion of the optical waveguide 112.

An optical fiber 190 may be disposed over the grating coupler 115. An optical signal 192 transmitted from the optical fiber 190 is transmitted to the optical waveguide 112 through the grating 113. At this point, the optical signal 194 in the optical waveguide 112 is transmitted in a direction parallel to the semiconductor substrate 100 by the grating 113. A transmission direction of the optical signal through the grating 115 is reversible. That is, the optical signal 196 via the optical waveguide 112 passes through the grating 113 to be outputted above the grating coupler 115. The optical signal 198 transmitted from the grating coupler 115 can be inputted into the optical fiber 190.

An upper cladding layer 117 is disposed on the grating coupler 115. In this case, the optical fiber 190 is disposed over the upper cladding layer 117. The upper cladding layer 117 includes at least one of on oxide, a nitride, and a nitride oxide. In certain circumstances, the upper cladding layer 117 can be omitted.

An input or output optical signal 192 or 198 of the optical fiber 190 can have a progression direction vertical to the top surface of the semiconductor substrate 100. Unlike this, to minimize the reflectivity between the optical fiber 190 and the grating coupler 115, an progression direction of the input or output optical signal 192 or 198 in the optical fiber 190 may be projected at a predetermined angle with respect to the top surface of the semiconductor substrate 100. For example, the input or output optical signal 192 or 198 in the optical fiber 190 may be obliquely projected at an angle of about 5° through about 10° with respect to a vertical line. However, the present invention is not limited thereto. The input or output optical signal 192 or 198 in the optical fiber 190 may be obliquely projected at a different angle with respect to the vertical line.

The semiconductor substrate 100 may be formed of silicon. However, the present invention is not limited thereto. For example, the semiconductor substrate 100 may be formed of germanium, or the cladding layer 102 may be formed of an insulating material having a different refractive-index than the semiconductor substrate 100. For example, the cladding layer 102 may be formed of an oxide. The grating coupler 115 may be formed of a semiconductor. Especially, the grating coupler 115 may be formed of a semiconductor having an excellent light transmission. For example, the grating coupler 115 may be formed of at least one of silicon, germanium, silicon-germanium, and a compound semiconductor (e.g., III-V group compound semiconductor).

At least one reflector 120a is disposed in the cladding layer 102. The reflector 120a may be formed of a material having a different refractive index than the cladding layer 102. The cladding layer 102 may be formed of an oxide. The reflector 120a may be formed of silicon. The reflector 120a may include a small amount of oxygen atoms. The reflector 120a is disposed below the grating coupler 115. Especially, the reflector 120a may be restrictedly disposed below the grating 113. The reflector 120a may have a plane shape parallel to the top surface of the semiconductor substrate 100. That is, the top surface of the reflector 120a may be parallel to the top surface of the semiconductor substrate 100. In this case, the top surface of the reflector 120a corresponds to a reflective surface. As illustrated, a plurality of the reflectors 120a with a plane shape is sequentially stacked in the cladding layer 102. At this point, the reflectors 120a are spaced apart from each other in a direction (i.e., a y axis direction) perpendicular to the top surface of the semiconductor substrate 100. The cladding layer 102 is disposed between the adjacent reflectors 120a. Of course, one reflector 120a with a plane shape can be disposed in the cladding layer 102 below the grating 113.

When the input optical signal 192 or 196 passes through the grating 113, a portion of the optical signal 192 or 196 can be transmitted below the optical waveguide 112. At this point, the portion of the optical signal 192 or 196 transmitted below the optical waveguide 112 is reflected by the reflector 120a. The light reflected by the reflector 120a is combined with the output optical signal 194 or 198. Accordingly, the coupling efficiency of the grating coupler 115 can be improved. When the reflectors 120a with a plane shape are stacked below the grating 113, the reflectivity with respect to a portion of the light transmitted below the optical waveguide can be further improved.

On the other hand, the reflector 120a may have a different form. For example, the reflector may have a non-parallel oblique plane on the top surface of the semiconductor substrate 100. This will be described with reference to the drawings.

Figure 2:
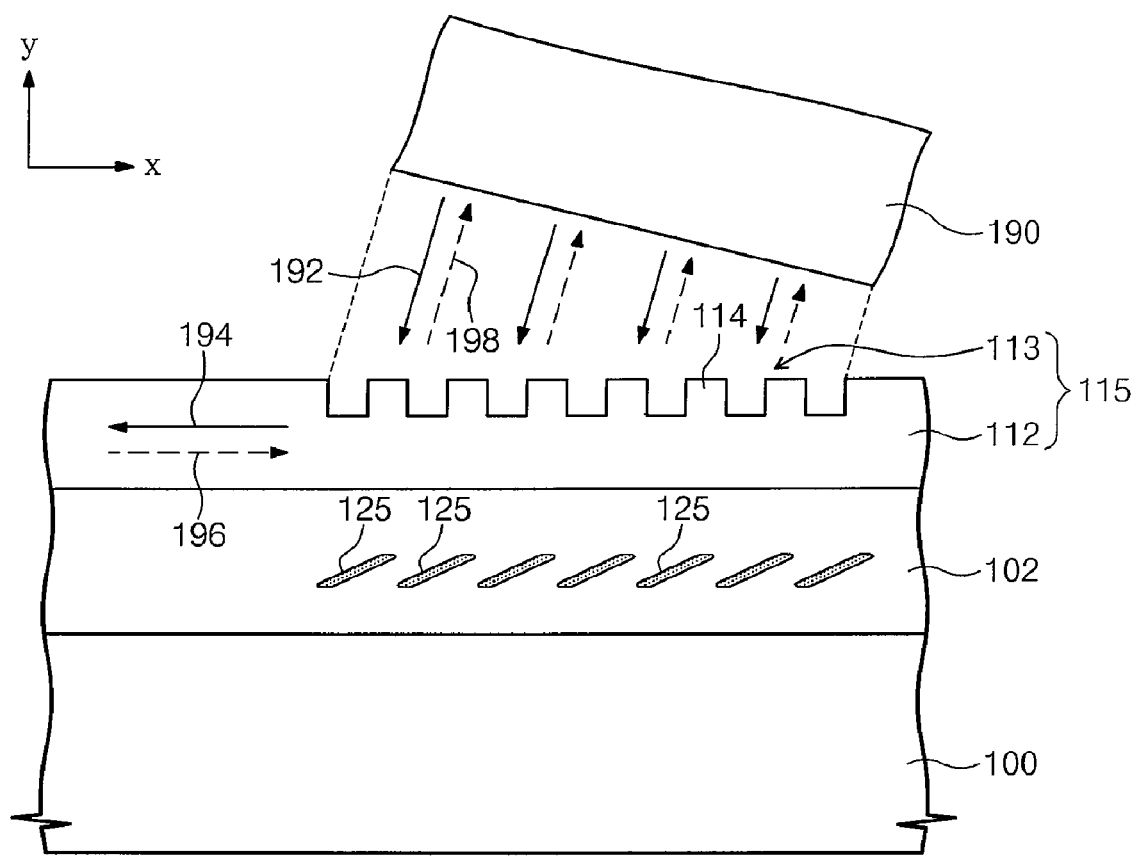
FIG. 2 is a sectional view illustrating one modification of a semiconductor integrated circuit of FIG. 1.

FIG. 2 is a sectional view illustrating one modification of a semiconductor integrated circuit of FIG. 1.

Referring to FIG. 2, at least one reflector 125 is disposed in the cladding layer 102 below the grating 113. The reflector 125 has a reflective surface oblique to the top surface of the semiconductor substrate 100. A plurality of reflectors 125 is disposed below the grating 113. At this point, the reflectors 125 may be arranged along one direction. The reflectors 125 are disposed at the same height. The reflectors 125 are equaldistantly arranged along the one direction. The oblique reflective surfaces of the reflectors 125 are parallel to each other. The reflector 125 may be formed of the same material as the reflector 120a of FIG. 1. Each of the reflectors 125 substantially has a uniform thickness. That is, each of the reflector 125 may be a flat board-shape that has a uniform thickness and is oblique at a predetermined angle with respect to the top surface of the semiconductor substrate 100. Although not illustrated, the upper cladding layer 117 of FIG. 1 is disposed on the grating coupler 115. For convenient description of FIG. 2, the upper cladding layer 117 of FIG. 1 is not illustrated. However, the upper cladding layer 117 of FIG. 1 may be disposed on the grating coupler 115 according to other modified embodiments.

Because the reflector 125 has an oblique reflective surface, an optical signal transmitted below the optical waveguide 112 can be more efficiently reflected to the optical waveguide 112. Therefore, coupling efficiency of the grating coupler 115 can be more improved. Additionally, because the reflectors 125 having a small width are arranged along the one direction at the same height and cover an entire region of the grating 113, a reflectivity of the transmitted optical signal is increased over an entire area of the grating 113.

Figure 3:
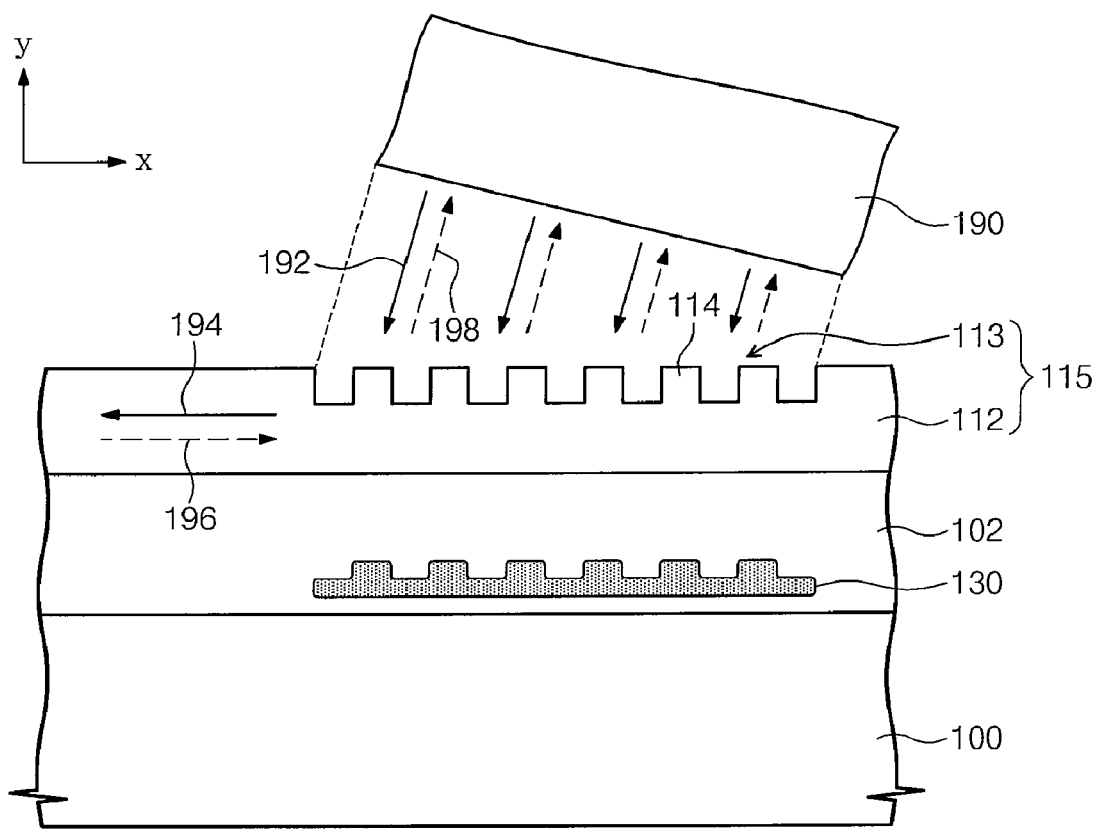
FIG. 3 is a sectional view illustrating another modification of a semiconductor integrated circuit of FIG. 1.

FIG. 3 is a sectional view illustrating another modification of a semiconductor integrated circuit of FIG. 1.

Referring to FIG. 3, the reflector 130 is disposed in the cladding layer 102 below the grating 113. The reflector 130 has a grating shape. In more detail, the reflector 130 includes a plane base part in the cladding layer 102 and protrusions protruding toward the top surface of the plane base part. The protrusions of the reflectors 130 are spaced apart from each other side by side along one direction parallel to the semiconductor substrate 100. The top surfaces of the protrusions have the same height. The both sidewalls of the protrusions may be perpendicular to the top surface of the semiconductor substrate 100. Unlike this, the both sidewalls of the protrusions may be oblique with respect to the top surface of the semiconductor substrate 100. The reflective surface of the reflector 130 includes the top surfaces and both sidewalls of the protrusions and the top surfaces of the base part between the protrusions. The grating-shaped reflector 130 reflects the light transmitted below the optical waveguide 112 to improve coupling efficiency of the grating coupler 115. The reflector 130 may be formed of the same material as the reflector 120a of FIG. 1.

Figure 4:
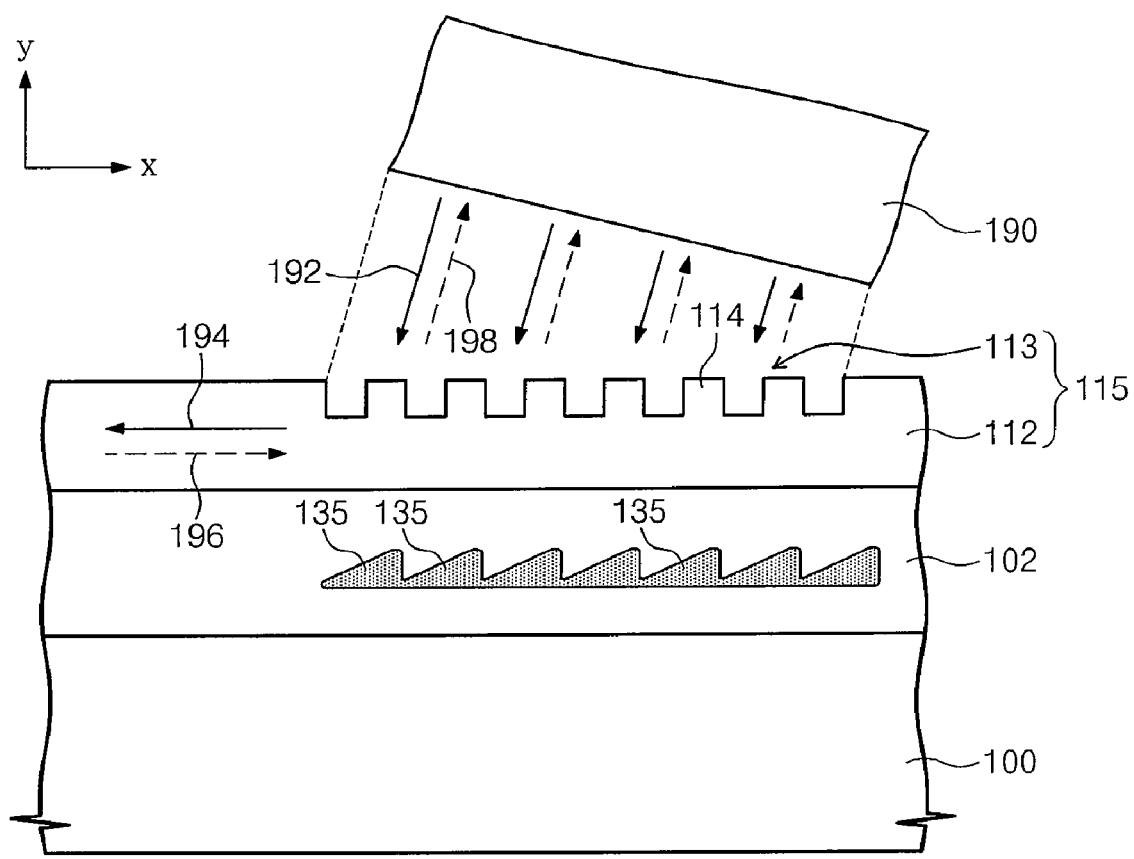
FIG. 4 is a sectional view illustrating further another modification of a semiconductor integrated circuit of FIG. 1.

FIG. 4 is a sectional view illustrating further another modification of a semiconductor integrated circuit of FIG. 1.

Referring to FIG. 4, the reflector of FIG. 4 is similar to the reflector 125 of FIG. 2. The reflector 135 has an oblique reflective surface. A plurality of the reflectors 135 is arranged along one direction parallel to the top surface of the semiconductor substrate 100. The reflectors 135 are disposed at the same height. The thickness of each of the reflectors 135 increases along the one direction. In more detail, the thickness of each of the reflector 135 increases as a position in the reflector 135 moves from a first sidewall of the reflector 135 toward a second sidewall of the reflector 135 in the one direction. The lower portions of the reflectors 135 are connected to each other. Unlike this, the reflectors 135 can be spaced apart from each other along the one direction. The reflectors 135 may be formed of the same material as the reflector 120a of FIG. 1.

A semiconductor integrated circuit according to the present invention includes at least one of reflects 120a, 125, 130, and 135 of FIGS. 1 through 4. In this case, the reflectors 120a, 125, 130, and 135 having respectively different shapes may be stacked in a direction perpendicular to the top surface of the semiconductor substrate 100.

Next, a method of forming a semiconductor integrated circuit including the grating coupler will be described with reference to the drawings.

Figure 5A:
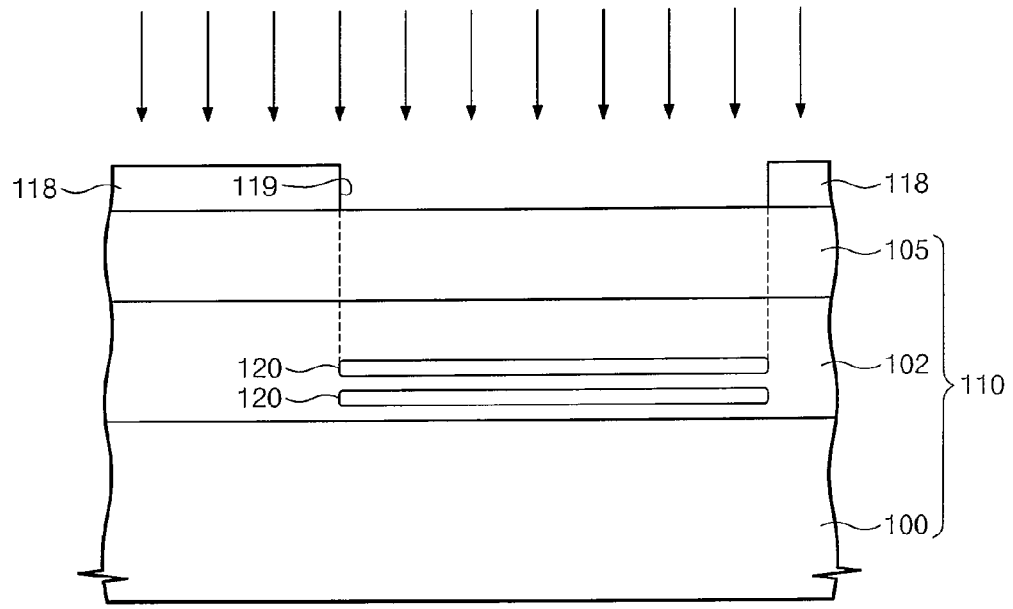
FIGS. 5A and 5B are sectional views illustrating a method of forming a semiconductor integrated circuit of FIG. 1.
Figure 5B:
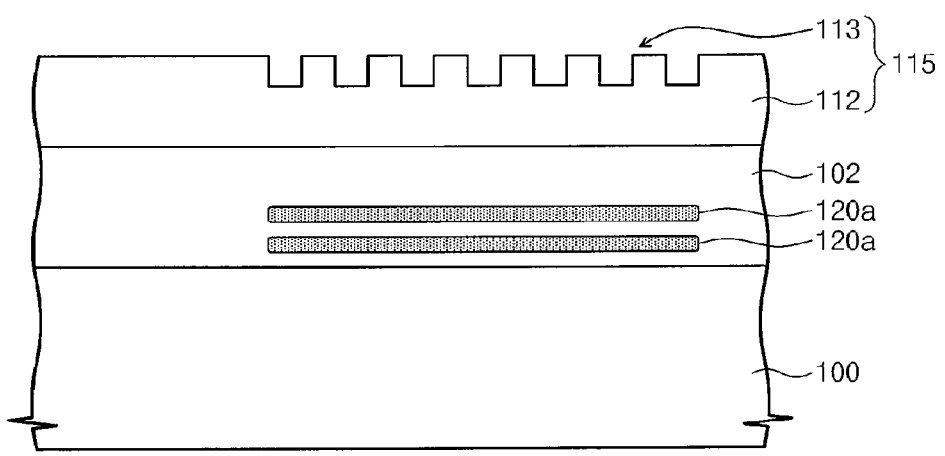

FIGS. 5A and 5B are sectional views illustrating a method of forming a semiconductor integrated circuit of FIG. 1.

Referring to FIG. 5A, prepared is a substrate 100 including a semiconductor substrate 100, a cladding layer 102, and a semiconductor layer 105, which are sequentially stacked. The semiconductor substrate 100 is formed of at least one of silicon, germanium, silicon-germanium, and a chemical compound. The cladding layer 102 may be formed of an insulating material having a different refractive-index than the semiconductor layer 105. The cladding layer 102 may be formed of an oxide. For example, the substrate 110 may be a silicon on insulator (SOI) substrate. Unlike this, the substrate 110 may be formed by ion implanting oxygen in the predetermined depth of a bulk semiconductor substrate. At this point, a region where the oxygen is implanted is formed of the cladding layer 102. At this point, the bulk semiconductor substrate below the region with oxygen corresponds to the semiconductor substrate 100, and a portion of the bulk semiconductor substrate, which is disposed on the region with oxygen, corresponds to the semiconductor layer 105.

A mask pattern 118 with an opening 119 is formed on the substrate 110. The opening 119 exposes a predetermined region where a grating is formed. Using the mask pattern 118 as an ion implantation mask, an element ion implantation process is performed to form an element implantation region 120 in the cladding layer 102. The element ion implantation process implants silicon ions. The element implantation region 120 may have a plane shape. The element ion implantation process is performed once. In this case, one element implantation region 120 is formed in the cladding layer 102. Unlike this, using the mask pattern 118 as an ion implantation mask, a plurality of element ion implantation processes can be sequentially performed. At this point, the element ion implantation processes are performed using respectively different implantation energies. Accordingly, a plurality of stacked element implantation regions 120 is formed in the cladding layer 102. At this point, the element implantation regions 120 may be spaced apart from each other in a direction perpendicular to the top surface of the semiconductor substrate 100.

Referring to FIG. 5B, after forming the element implantation regions 120, the mask pattern 118 is removed. Next, an annealing process is performed on the substrate 110. Therefore, the elements in the element implantation region 120 are combined to form the reflector 120a. Furthermore, using the element ion implantation process, damaged element combination in the semiconductor layer 105 can be recovered. The annealing process can be additionally performed. Unlike this, the annealing process can be replaced with another heat treatment process performed on the substrate 110. For example, the annealing process can be replaced with a dopant activation process performed on the substrate 110.

The semiconductor layer 105 is patterned to form a grating coupler 115 including an optical waveguide 112 and a grating 113 on the optical waveguide 112. The grating coupler 115 is formed by a patterning process twice. For example, a process of forming the grating coupler 115 includes a first patterning process for forming the grating 113 on the upper portion of the semiconductor layer 105 and a second patterning process for forming the optical waveguide 112, by patterning the semiconductor layer 105. The first patterning process is performed first, and then the second patterning process is performed, and vice versa.

As mentioned the above, after forming the reflectors 120a first, the grating coupler 115 is formed. Unlike this, after forming the grating coupler 115, the reflector 120a can be formed also.

According to the above method, the reflectors 120a are formed through an element ion implantation process. Accordingly, the forming of the reflectors 120a is very simple. Consequently, a manufacturing process of a semiconductor integrated circuit including the reflectors 120a and the grating coupler 115 can be simplified. That is, the productivity of a semiconductor integrated circuit having an excellent coupling efficiency can be improved.

Figure 6A:
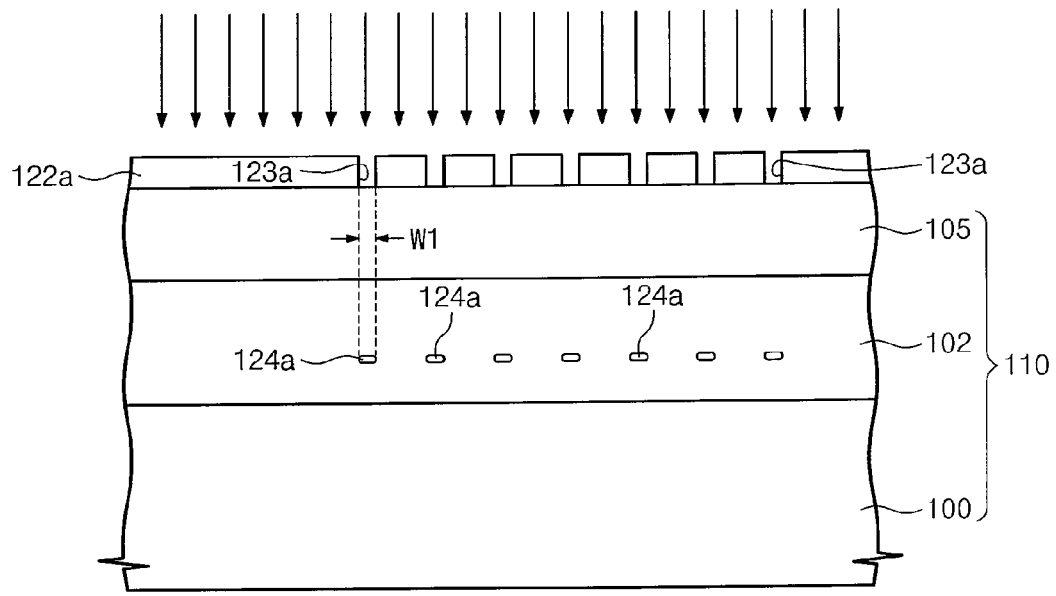
FIGS. 6A to 6D are sectional views illustrating a method of forming a semiconductor integrated circuit of FIG. 2.
Figure 6B:
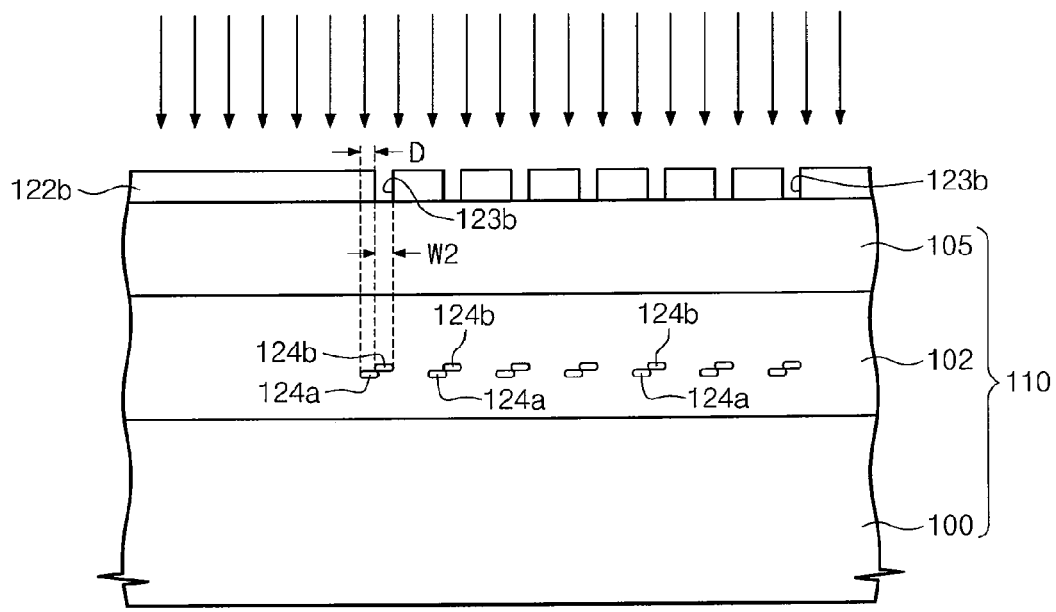
Figure 6C:
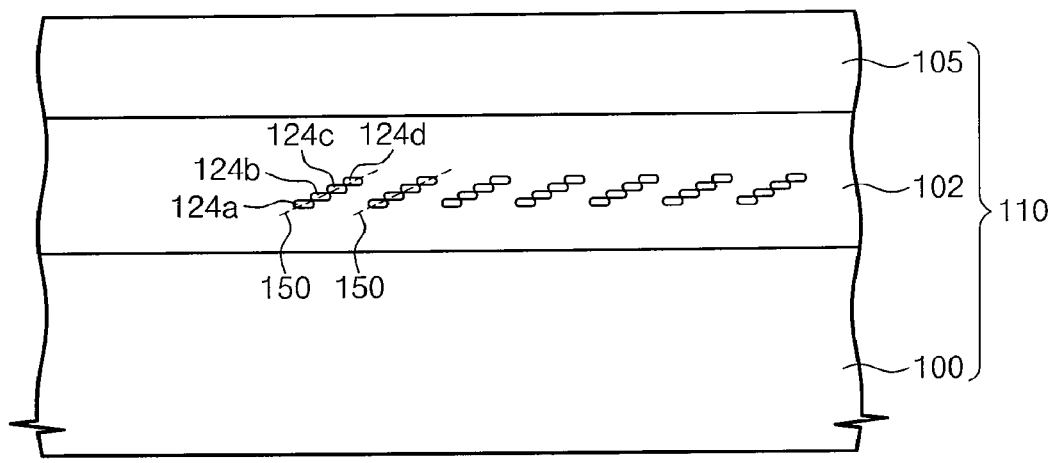
Figure 6D:
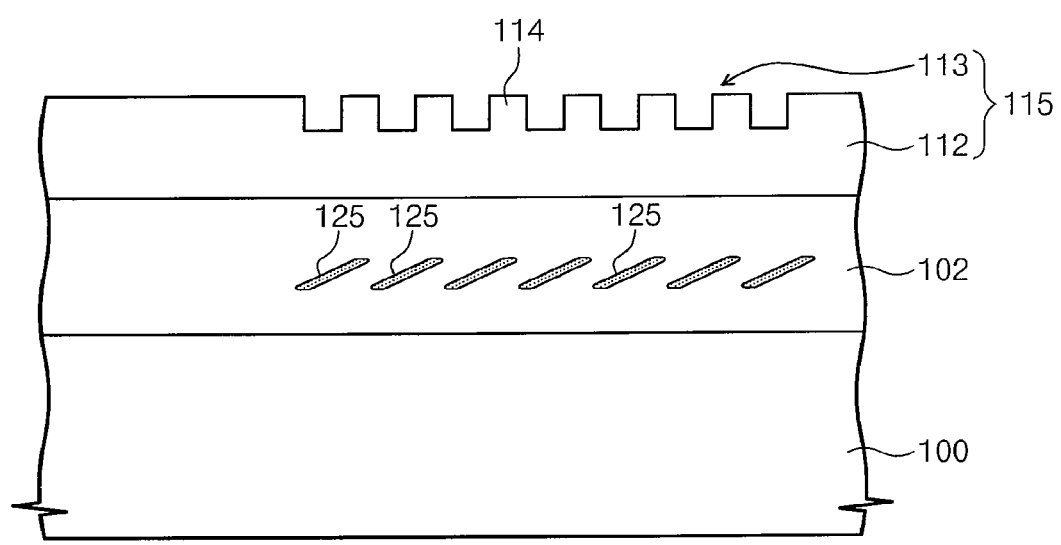

FIGS. 6A and 6D are sectional views illustrating a method of forming a semiconductor integrated circuit of FIG. 2.

Referring to FIG. 6A, a fist mask pattern 122a is formed on a substrate 110 including a semiconductor substrate 100, a cladding layer 102, and a semiconductor layer 105, which are sequentially stacked. The first mask pattern 122a includes a plurality of first openings 123a. The first openings 123a are spaced apart from each other side by side along one direction parallel to the top surface of the semiconductor substrate 100. The first openings 123a are equal-distantly arranged along the one direction. The first openings 123a have the first widths W1 in the one direction. At this point, the first widths W1 of the first openings 123a are identical to each other.

Using the first mask pattern 122a as an ion implantation mask, a first element ion implantation process is performed with a first implantation energy. Accordingly, a plurality of first element implantation regions 124a is formed in the cladding layer 102. The first element ion implantation process can implant silicon ions. Due to the first mask pattern 122a, the first element implantation regions 124a are equal-distantly spaced apart from each other along the one direction. The first element implantation regions 124a are formed at the same height.

Next, the first mask pattern 122a is removed, and a second mask pattern 122b having a plurality of second openings 123b is formed on the substrate 110. The second openings 123b are spaced apart from each other along the one direction. The second openings 123b may be equal-distantly arranged along the one direction. Each of the second openings 123b has the second width W2 in the one direction. The second width W2 may be identical to the first width W1. The second openings 123b are respectively formed at the positions, each of which is spaced a first separation distance D apart from the positions where the first openings 123a are formed along the one direction. The first separation distance D is greater than 0 and equal to or less than the first width W1.

Using the second mask pattern 122b as an ion implantation mask, a second element ion implantation process is performed with a second implantation energy. At this point, the second implantation energy may be less than the first implantation energy. The second element ion implantation process implants the same element ions as the first element ion implantation process. Due to the second element ion implantation process, a plurality of second element implantation regions 124a is formed in the cladding layer 102. The second element implantation regions 124b are respectively formed on one edges of the first element implantation regions 124a. The second element implantation regions 124b may respectively contact one edges of first element implantation regions 124a. Due to the second openings 123b, the second element implantation regions 124b may have the same widths as the first element implantation regions 124a. The second element implantation regions 124b are equal-distantly spaced in the one direction and disposed at the same height. After forming the second element implantation regions 124b, the second mask pattern 122b is removed.

Referring to FIG. 6c, a third mask pattern having third openings is formed on the substrate 110. The third openings are equal-distantly arranged along the one direction and have the same third widths. The third widths of the third openings may be identical to the first width W1. The third openings may be formed at the positions, each of which is spaced a second separation distance apart from the positions where the second openings 123b are formed along the one direction. The second separation distance may be identical to the first distance D.

Using the third mask pattern as an ion implantation mask, a third element ion implantation process is performed with a third implantation energy. The third implantation energy may be less than the second implantation energy. The third element ion implantation process can be performed using silicon. A plurality of third element implantation regions 124c is formed in the cladding layer 102 through the third element ion implantation process. The third element implantation regions 124c respectively contact one edges of the second element implantation regions 124b. The third element implantation regions 124c may have the same width as the first and second element implantation regions 124a and 124b. Then, the third mask pattern is removed.

Next, a fourth mask pattern having fourth openings that are equal-distantly arranged in the one direction is formed on the substrate 110. The fourth width of the fourth opening may be identical to the first width W1. The fourth openings are respectively formed at the positions, each of which is spaced a third separation distance apart from the positions where the third openings are formed. The third separation distance may be identical to the first separation distance D. Using the fourth mask pattern as an ion implantation mask, a fourth element ion implantation process is performed using a fourth implantation energy. Therefore, a plurality of fourth element implantation regions 124d that are equal-distantly arranged along the one direction is formed in the cladding layer 102. The fourth element implantation regions 124d contact one edges of the third element implantation regions 124c. The fourth element ion implantation process can implant silicon ions. Next, the fourth mask pattern is removed.

The first, second, third, and fourth element implantation regions 124a, 124b, 124c, and 124d may have the same element. The first, second, third, and fourth element implantation regions 124a, 124b, 124c, and 124d may be obliquely stacked. That is, a virtual line 150 via the centers of the first, second, third, and fourth element implantation regions 124a, 124b, 124c, and 124d is oblique with respect to the top surface of the semiconductor substrate 100. The virtual line 150 is a straight line.

In the above method, using the first, second, third, and fourth mask patterns having the first, second, third, and fourth openings, selective element ion implantation processes are performed four times to form the first to fourth element implantation regions 124a, 124b, 124c, and 124d. Unlike this, two or more than five times of selective element ion implantation processes are performed to form a plurality of element implantation regions that are obliquely stacked in the cladding layer 102 and contact each other. The formation order of the first to fourth element implantation regions 124a, 124b, 124c, and 124d is random.

Referring to FIG. 6d, an annealing process is performed on the substrate 110 having the first to fourth element implantation regions 124a, 124b, 124c, and 124d to form a plurality of reflectors 125 in the cladding layer 102. The annealing process may be replaced with another annealing process that can be performed on the substrate 110 such as the annealing process of FIG. 5B. Because of the annealing process, elements in the first to fourth element implantation regions 124a, 124b, 124c, and 124d are combined to form a plurality of the reflectors 125. At this point, the elements in the first to fourth element implantation regions 124a, 124b, 124c, and 124d are moved by the annealing process, such that each of the reflectors 125 has a flat reflective surface, which is oblique to the top surface of the semiconductor substrate 100.

The semiconductor layer 105 is patterned to form a grating coupler 115 including the optical waveguide 112 and the grating 113. A method of forming the grating coupler 115 is identical to the method illustrated with reference to FIG. 5B. After the forming of the first to fourth element implantation regions 124a, 124b, 124c, and 124d, the grating coupler 115 can be formed. On the contrary, after forming the grating coupler 115, the first to fourth element implantation regions 124a, 124b, 124c, and 124d can be formed.

Figure 7A:
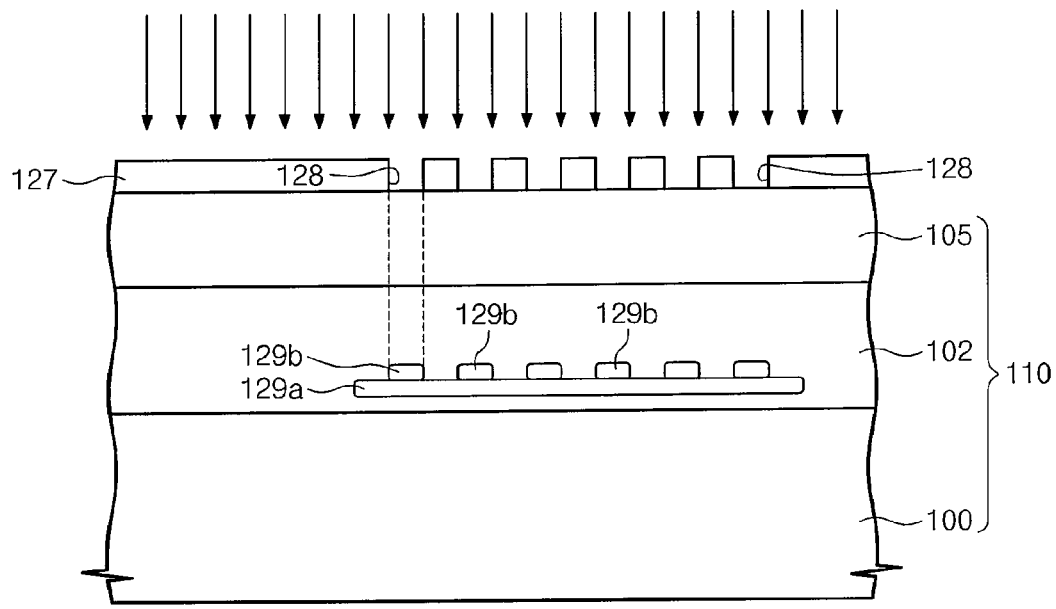
FIGS. 7A and 7B are sectional views illustrating a method of forming a semiconductor integrated circuit of FIG. 3.
Figure 7B:
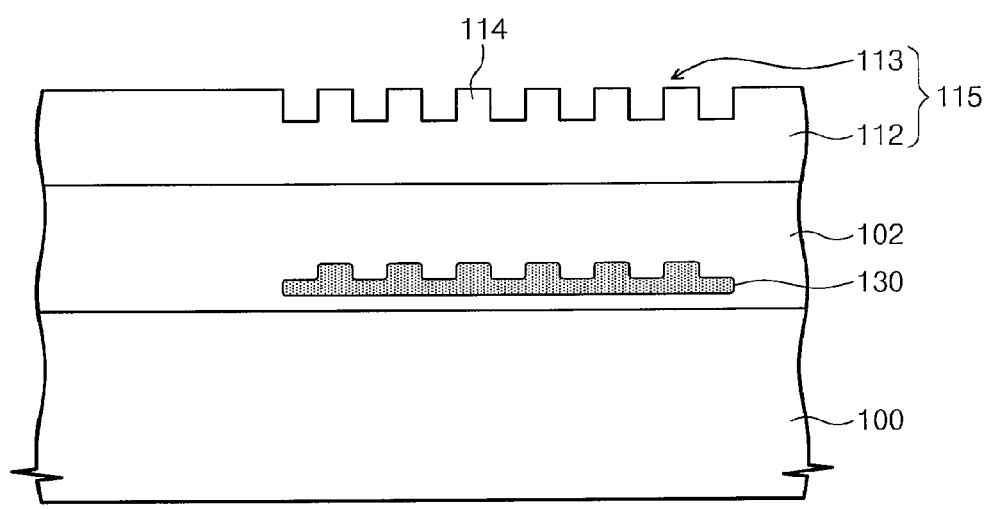

FIGS. 7A and 7B are sectional views illustrating a method of forming a semiconductor integrated circuit of FIG. 3.

Referring to FIG. 7A, prepared is a substrate 100 including a semiconductor substrate 100, a cladding layer 102, and a semiconductor layer 105. A first mask pattern having a first opening is formed on the substrate 110. Using the first mask pattern as an ion implantation mask, a first element ion implantation process is performed with a first implantation energy. Therefore, the first element implantation region 129a is formed in the cladding layer 102. The first element ion implantation process implants silicon ions. The first element implantation region 129a has a plane shape. Next, the first mask pattern is removed.

A second mask pattern 127 having a plurality of second openings is formed on the substrate 110. The second openings 128 are formed over the first element implantation regions 129a. The second openings 128 are equal-distantly arranged.

Using the second mask pattern 127 as an ion implantation mask, a second element ion implantation process is performed with a second implantation energy. The second implantation energy is less than the first implantation energy. The second element ion implantation process implants silicon ions. Due to the second element ion implantation process, a plurality of second element implantation regions 129b is formed on the first element implantation region 129a. The second element implantation regions 129b are equal-distantly arranged. The second element implantation regions 129b may contact the top of the first element implantation region 129a. Next, the second mask pattern 127 is removed. After forming the second element implantation region 129b, the first element implantation region 129b can be formed.

Referring to FIG. 7B, an annealing process is performed on the substrate 110 to form a grating-shaped reflector 130. The annealing process can be replaced with another annealing process that can be performed on the substrate 110, as illustrated in the FIGS. 5B and 6D.

The semiconductor layer 105 is patterned to form the grating coupler 115. The grating coupler 115 can be formed using the same method described with reference to FIG. 5B.

Figure 8A:
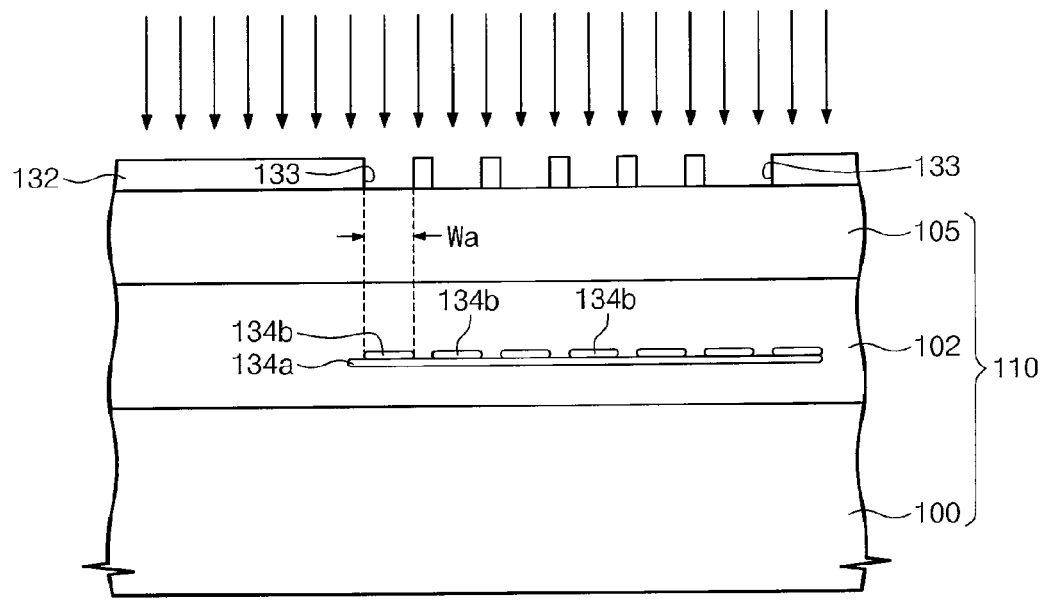
FIGS. 8A to 8D are sectional views illustrating a method of forming a semiconductor integrated circuit of FIG. 4.
Figure 8B:
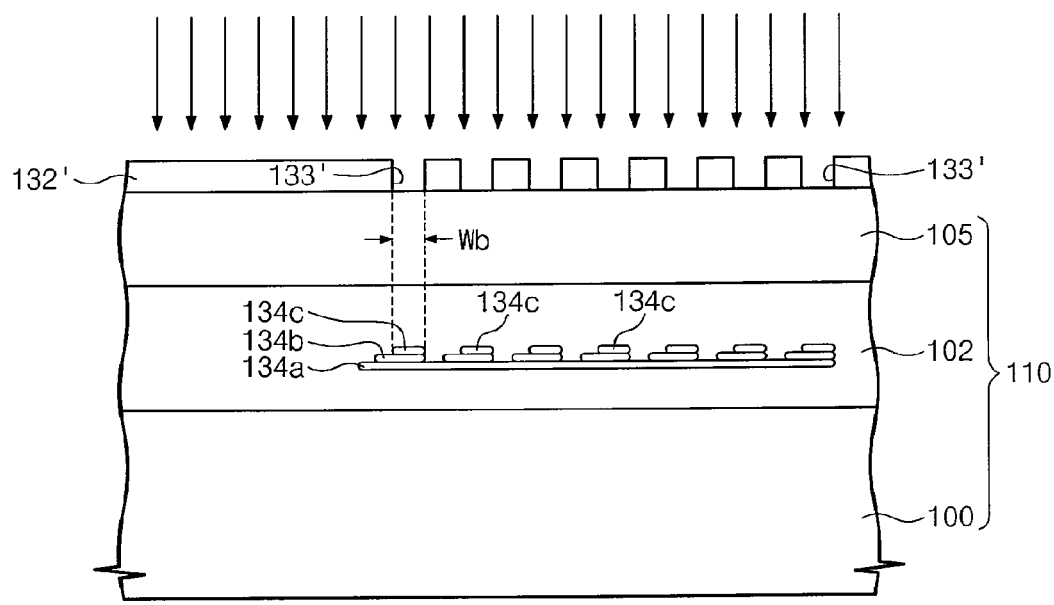
Figure 8C:
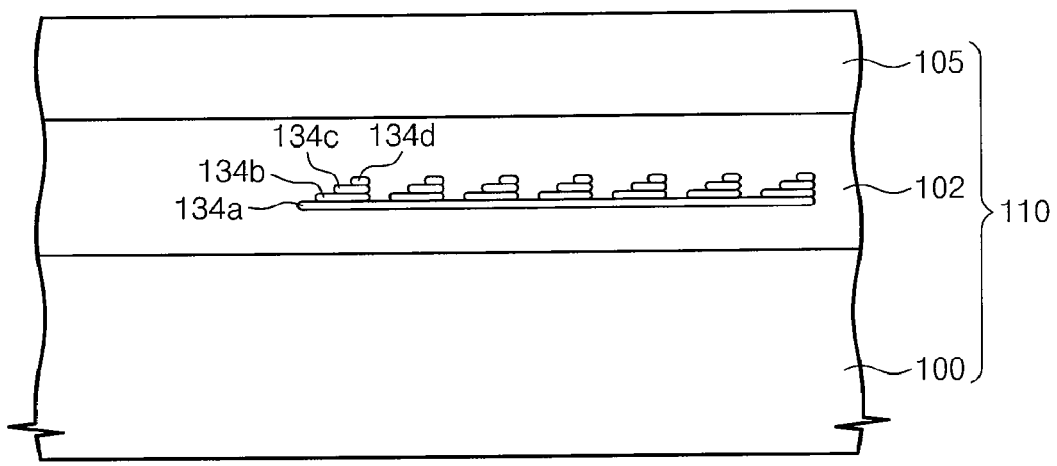
Figure 8D:
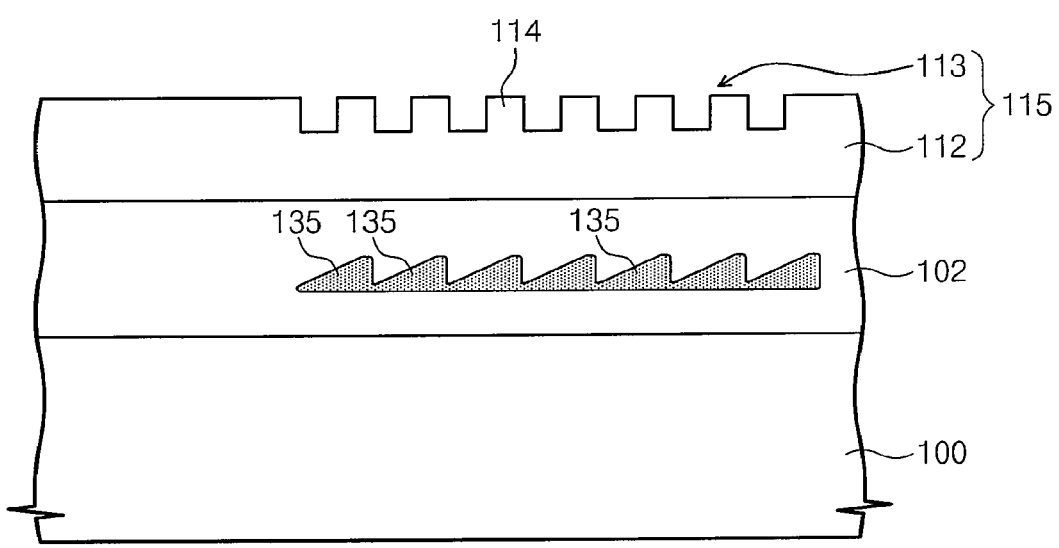

FIGS. 8A and 8D are sectional views illustrating a method of forming a semiconductor integrated circuit of FIG. 4.

Referring to FIG. 8A, prepared is a substrate 110 including a semiconductor substrate 100, a cladding layer 102, and a semiconductor layer 105. A first mask pattern having at least one first opening is formed on the substrate 110. Using the first mask pattern as an ion implantation mask, the first element ion implantation process is performed with a first implantation energy. Therefore, a first element implantation region 134a is formed in the cladding layer 102. The first element implantation region 134a may have one plane shape. Unlike this, a plurality of first element implantation regions 134a having the first width may be arranged along one direction parallel to the top surface of the semiconductor substrate 100. In FIG. 8A, a plurality of element implantation regions 134a are connected to each other side by side to form one plane shape. Next, the first mask pattern is removed.

A second mask pattern 132 having a plurality of second openings 133 is formed on the substrate 110. The second openings 133 are spaced apart from each other along the one direction. Each of the second openings 133 has the second width Wa in the one direction. Using the second mask pattern 132 as a mask, a second element ion implantation process of a second implantation energy is performed to form a plurality of second element implantation regions 134b in the cladding layer 102. The second implantation energy is less than the first implantation energy. The second element implantation regions 134b are arranged to be spaced apart from each other. The second element implantation region 134b may contact the top of the first element implantation region 134a. The second element implantation regions 134b have the second width Wa.

When a plurality of first element implantation regions 134a is formed in the cladding layer 102 to have the first width, the second width Wa is formed to be less than the first width.

Referring to FIG. 8B, the second mask pattern 132 is removed, and a third mask pattern 132' having a plurality of third openings 133' is formed on the substrate 110. Each of the third openings 133' has the third width Wb. The third width Wb is less than the second width Wa. Using the third mask pattern 132 as an ion implantation mask, a third element ion implantation process of a third implantation energy is performed. The third implantation energy is less than the first implantation energy. Through the third element ion implantation process, the first element implantation regions 134c are respectively formed in the cladding layer 102 and on the second element implantation regions 134b. The third element implantation regions 134c have the third width Wb.

Referring to FIG. 8C, the third mask pattern 132 is removed, and a fourth mask pattern having a plurality of fourth openings is formed on the substrate 110. Each of the fourth openings has the fourth width. The fourth width is less than the third width Wb. Using the fourth mask pattern as an ion implantation mask, a fourth element ion implantation process of a fourth implantation energy is performed. The fourth implantation energy is less than the third implantation energy. A plurality of fourth element implantation regions 134d are formed in the cladding layer 102 through the forth element ion implantation process. The fourth element implantation regions 134d are respectively formed on the third element implantation regions 134c. Next, the fourth mask pattern is removed. The first to fourth selective element ion implantation processes can implant silicon ions. The first to fourth element implantation regions 134a, 134b, 134, and 134d are implanted with the same element.

The first to fourth element implantation regions 134a, 134b, 134c, and 134d are sequentially stacked. The widths of the first to fourth element implantation regions 134a, 134b, 134c, and 134d are different from each other. The widths of the first to fourth element implantation regions 134a, 134b, 134c, and 134d are decreased from the lowermost element implantation region toward the uppermost element implantation, and one sidewalls of at least second to fourth implantation layers 134b, 134c, and 134d are vertically aligned. Accordingly, the other sidewalls of at least the second to fourth implantation layers 134b to 134d have a stepped shape.

Referring to FIG. 8D, an annealing process is performed on the substrate 110 having the first to fourth element implantation regions 134a, 134b, 134, and 134d. Accordingly, a plurality of reflectors 135 is formed in the cladding layer 102. Each of the reflectors 135 has an oblique reflective surface with respect to the top surface of the semiconductor substrate 100. The annealing process may be replaced with another annealing process that can be performed on the substrate 110.

The semiconductor layer 105 is patterned to form a grating coupler 115. A method of forming the grating coupler 115 is identical to that of the FIG. 5B.

According to the method of FIGS. 8A through 8D, a plurality of selective element ion implantation processes having respectively different elements is sequentially performed. Therefore, sequentially-stacked element implantation regions are formed. At this point, one sidewalls of stacked element implantation regions are arranged to each other, and the widths of the stacked element implantation regions are decreased from the lowermost element implantation region toward the uppermost element implantation region. Therefore, the reflector 135 having an oblique reflective surface is formed through the annealing process.

A method of forming a semiconductor integrated circuit according to the present invention includes at least one of the method of forming the reflector of FIGS. 5A and 5B, the method of forming the reflector of FIGS. 6A through 6D, the method of forming the reflector of FIGS. 7A through 7D, and the method of forming the reflector of FIGS. 8A through 8D. In this case, the reflectors 120a, 125, 130, and 135 having the respectively different forms may be stacked in the cladding layer 102 in a direction perpendicular to the top surface of the semiconductor substrate 100.

Second Embodiment

A semiconductor integrated circuit according to the second embodiment of the present invention includes a reflector in a semiconductor substrate. Like reference numerals refer to like elements throughout.

Figure 9:
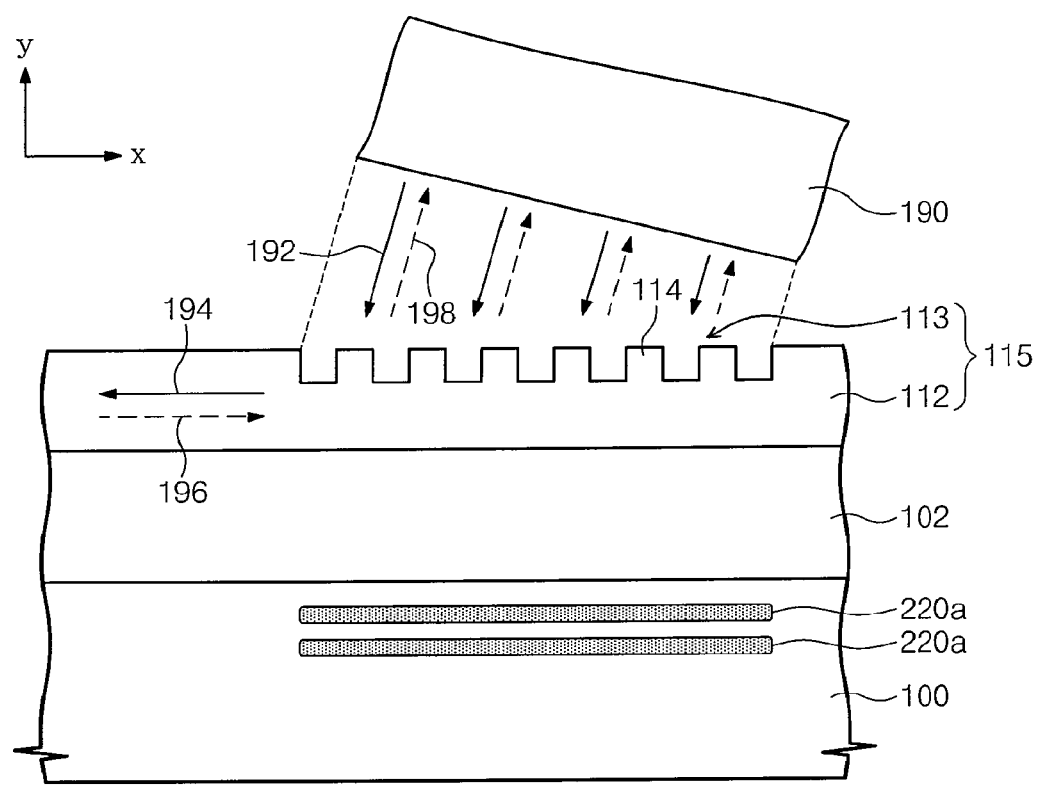
FIG. 9 is a sectional view of a semiconductor integrated circuit including a grating coupler according to another embodiment of the present invention.

FIG. 9 is a sectional view of a semiconductor integrated circuit including a grating coupler according to another embodiment of the present invention.

Referring to FIG. 9, a cladding layer 102 is disposed on a semiconductor substrate 100, and a grating coupler 115 is disposed on the cladding layer 102. The grating coupler 115 includes an optical waveguide 112 on the cladding layer 102, and a grating 113 on the optical waveguide 112. The semiconductor substrate 100 is formed of at least one of silicon, germanium, silicon-germanium, and a chemical compound, as illustrated in the first embodiment.

At least one reflector 220a is disposed in the semiconductor substrate 100 below the grating 113. The reflector 220a is formed of a material having a different reflactive-index than the semiconductor substrate 100. For example, the reflector 220a includes at least one of an oxide, a nitride, and an oxide nitride. The reflector 220a has a plane shape parallel to the top surface of the semiconductor substrate 100. Accordingly, the reflector 220a has a reflective surface parallel to the top surface of the semiconductor substrate 100.

The reflectors 220a are sequentially stacked in the semiconductor substrate 100 below the grating 113. At this point, the reflectors 220a are spaced apart from each other in a direction perpendicular to the top surface of the semiconductor substrate 100.

A portion of an optical signal transmitted below the optical waveguide 112 is reflected by the reflector 220a, and then returns to the optical waveguide 112. Therefore, an optical coupling efficiency of a semiconductor integrated circuit including the grating coupling 115 can be improved.

The reflector 220a disposed in the semiconductor substrate 100 below the grating coupling 113 may have different forms having an oblique plane un-parallel to the top surface of the semiconductor substrate 100. This will be described with reference to the drawings.

Figure 10:
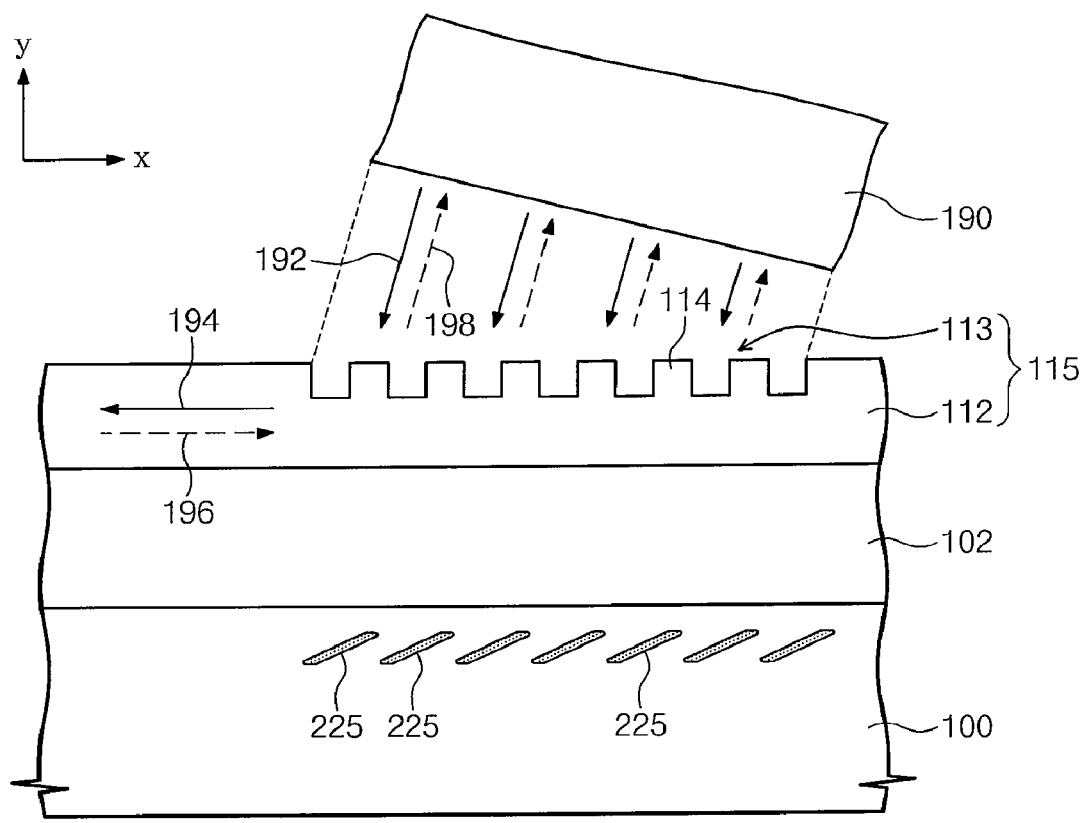
FIG. 10 is a sectional view illustrating one modification of a semiconductor integrated circuit of FIG. 9.

FIG. 10 is a sectional view illustrating one modification of a semiconductor integrated circuit of FIG. 9.

Referring to FIG. 10, a plurality of reflectors 225 is disposed in a semiconductor substrate 100 below a grating 113. Each of the reflectors 225 has a reflective surface oblique to the top surface of the semiconductor substrate 100. The reflectors 225 are disposed at the same height along one direction parallel to the top surface of the semiconductor substrate 100. The reflectors 225 may have the same thickness. The reflectors 225 may be formed of the same material as the reflector 220a of FIG. 9.

Figure 11:
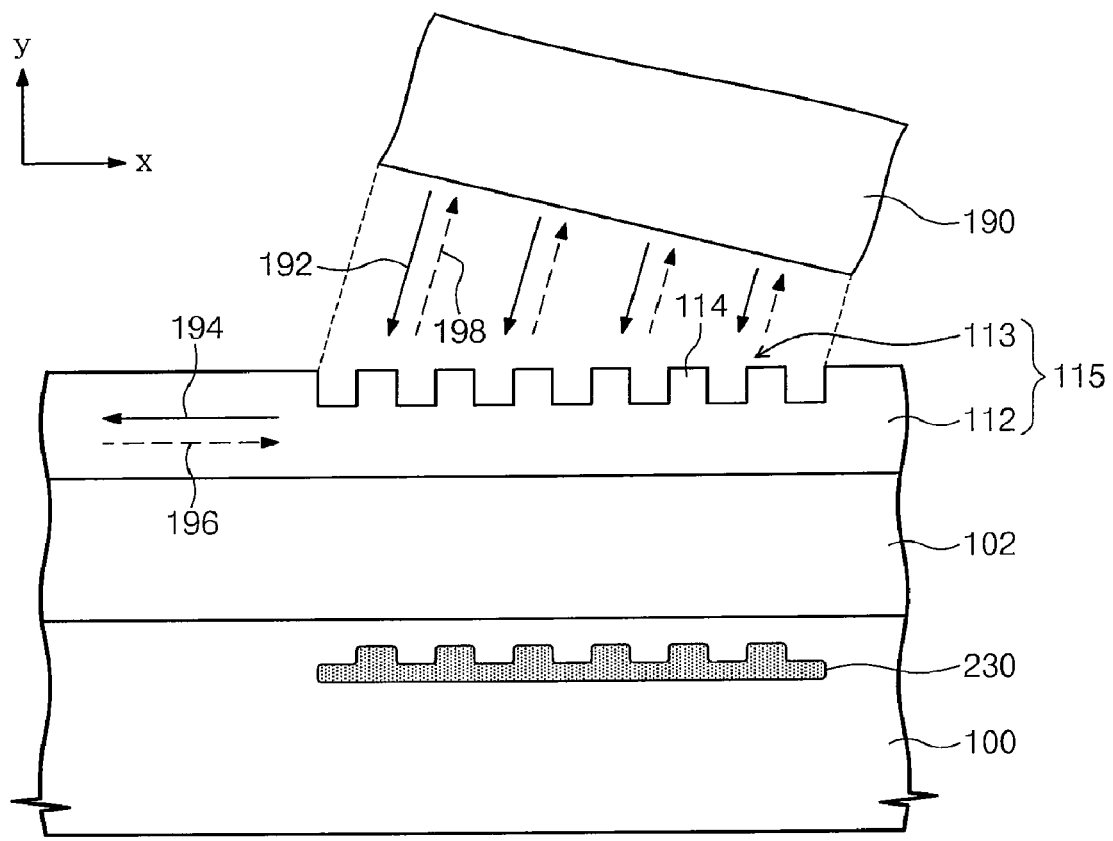
FIG. 11 is a sectional view illustrating another modification of a semiconductor integrated circuit of FIG. 9.

FIG. 11 is a sectional view illustrating one modification of a semiconductor integrated circuit of FIG. 9.

Referring to FIG. 11, a reflector 230 is disposed in a semiconductor substrate 100 below a grating 113. The reflector 230 has a grating shape. In more detail, the reflector 230 includes protrusions spaced apart from each other side by side. Planes of the reflector 230 include top surfaces and both sidewalls of the protrusions of the reflector 230. The reflector 230 may be formed of the same material as the reflector 220a of FIG. 9.

Figure 12:
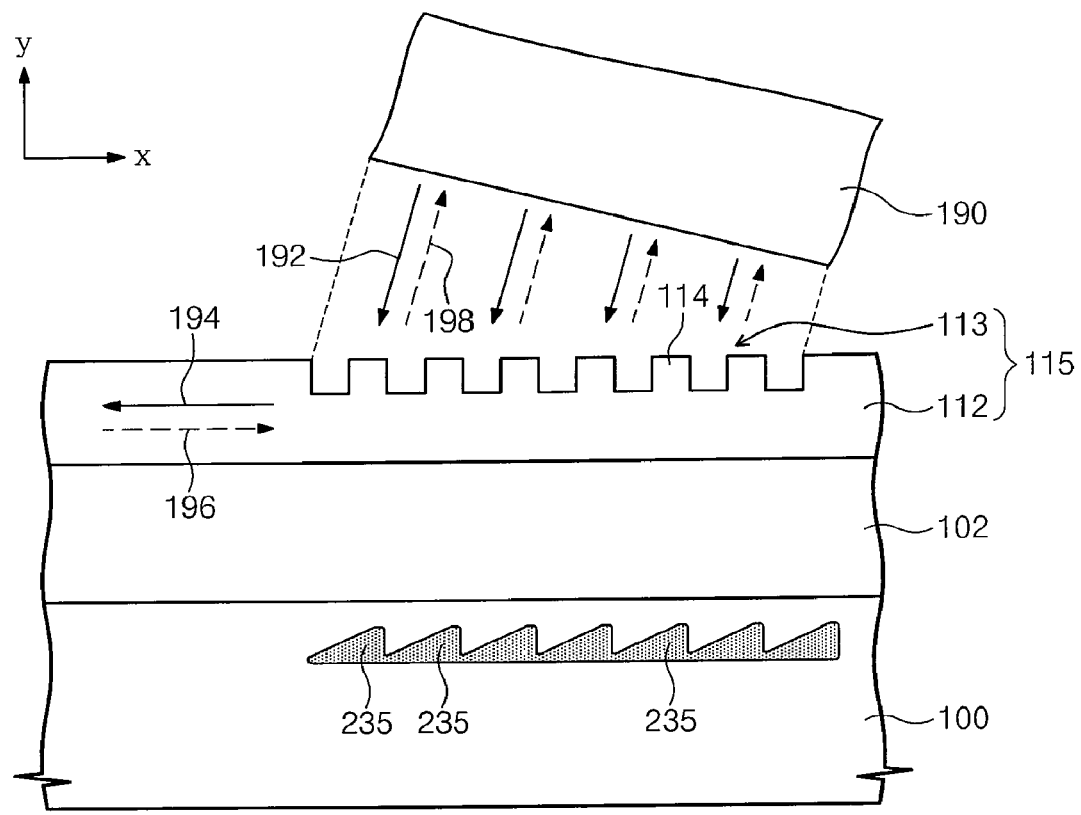
FIG. 12 is a sectional view illustrating further another modification of a semiconductor integrated circuit of FIG. 9.

FIG. 12 is a sectional view illustrating one modification of a semiconductor integrated circuit of FIG. 9.

Referring to FIG. 12, a plurality of reflectors 235 is disposed in a semiconductor substrate 100 below the grating 113. The reflectors 235 have a reflective surface oblique to the top surface of the semiconductor substrate 100. The width of each of the reflectors 235 increases as it moves along one direction parallel to the top surface of the semiconductor substrate 100. The lower portions of the reflectors 235 are connected to each other. The reflectors 235 are formed of the same material as the reflector 220a of FIG. 9.

A semiconductor integrated circuit according to one embodiment includes at least one of the reflectors 220a, 225, 230, and 235 of FIGS. 9 through 12. In this case, the reflectors 220a, 225, 230, and 235 having respectively different forms may be stacked and arranged in a direction perpendicular to the top surface of the semiconductor substrate 100.

Additionally, a material different from the cladding layer 102 may be interposed between the semiconductor substrate 100 and the grating 113. This will be described with reference to the drawings.

Figure 13:
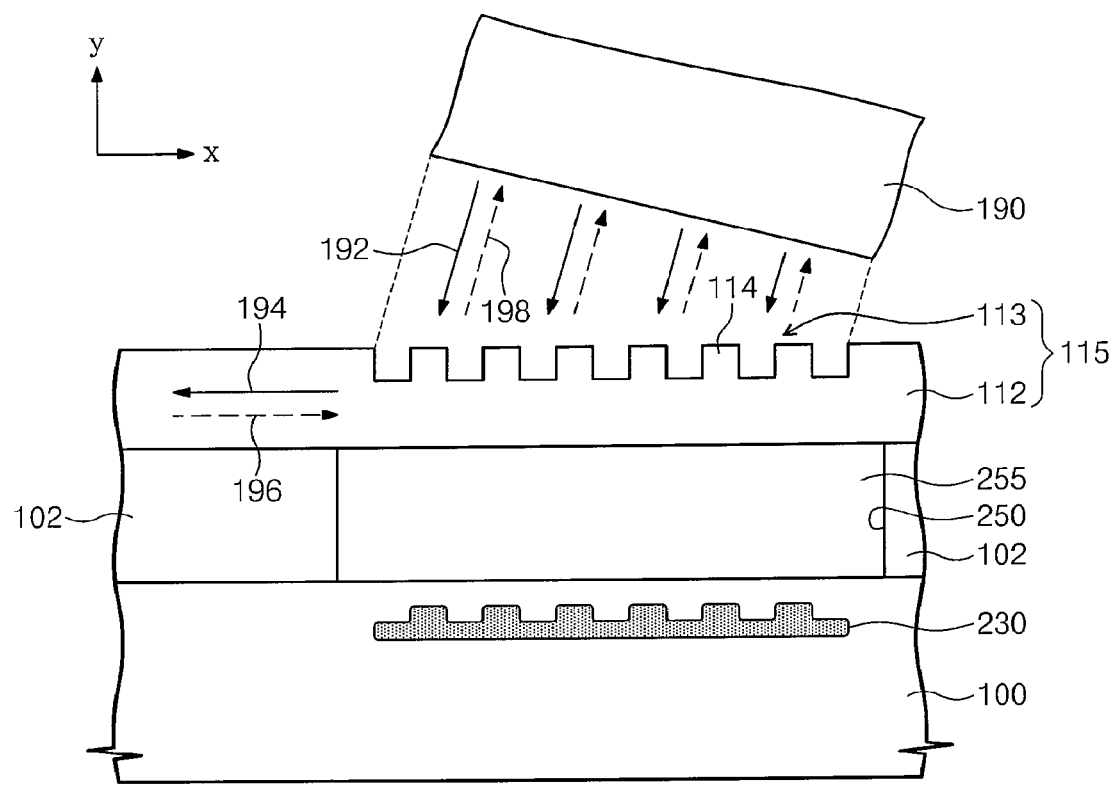
FIG. 13 is a sectional view illustrating further another modification of a semiconductor integrated circuit of FIG. 9.

FIG. 13 is a sectional view illustrating one modification of a semiconductor integrated circuit of FIG. 9.

Referring to FIG. 13, a reflector 230 is disposed in a semiconductor substrate 100 below the grating 113. A low refractive-index material 255 fills a region 250, where a cladding layer 102 is removed, below the grating 113. The low refractive-index material 255 may have a lower refractive-index than the semiconductor substrate 100. Additionally, the refractive-index of the low refractive-index material 255 may be lower than that of the grating coupler 115. For example, the low refractive-index material 255 includes at least one of air, a nitride, and an oxide nitride. A boundary of the low refractive-index material 255 and the semiconductor substrate 100 constitutes a reflective surface. Accordingly, a portion of an optical signal transmitted below an optical waveguide 112 of the grating coupler 115 is reflected at the boundary between the low refractive-index material 255 and the semiconductor substrate 100, and then returns to the optical waveguide 112. Consequently, due to the boundary between the reflector 230, the low refractive-index material 255 and the semiconductor substrate 100, a coupling efficiency of the semiconductor integrated circuit including the grating coupler 115 can be further improved.

The reflector 230 may be replaced with one of the reflector 220a of

FIG. 9, the reflector 225 of FIG. 10, and the reflector 235 of FIG. 12. Furthermore, at least one of the reflectors 220a, 225, 230, and 235 of FIGS. 9 through 12 may be disposed in the semiconductor substrate 100 below the grating 113. In this case, the reflectors 220a, 225, 230, and 235 having respectively different forms are stacked and arranged in a direction perpendicular to the top surface of the semiconductor substrate 100.

Figure 14:
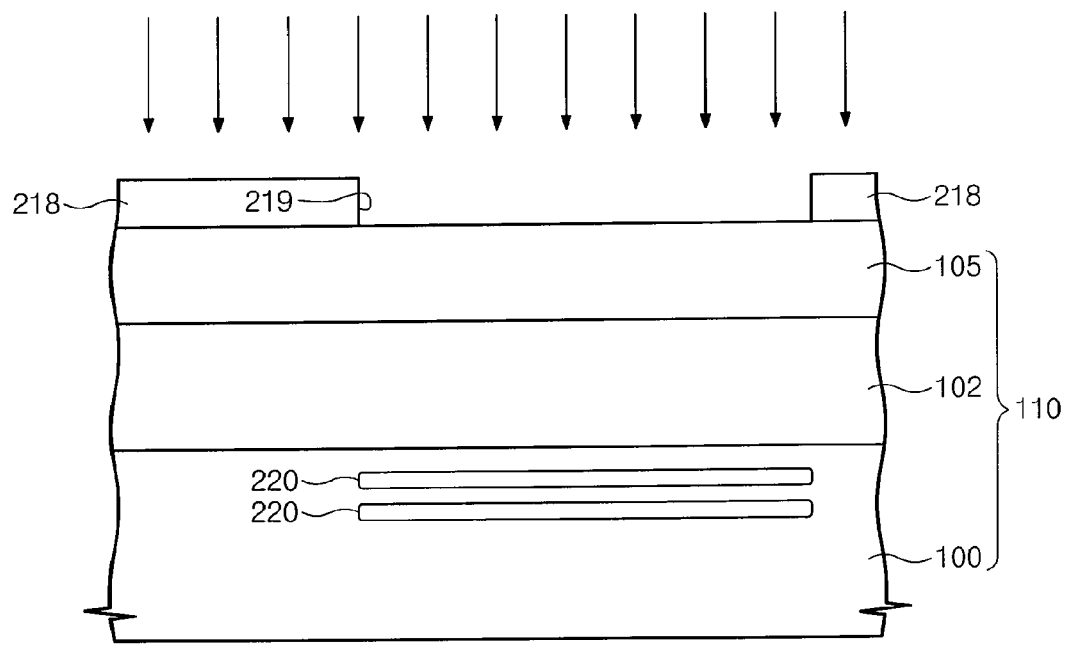
FIG. 14 is a sectional view illustrating a method of forming a semiconductor integrated circuit of FIG. 9.

FIG. 14 is a sectional view illustrating a method of forming a semiconductor integrated circuit of FIG. 9.

Referring to FIG. 14, prepared is a substrate 110 including a semiconductor substrate 100, a cladding layer 102, and a semiconductor layer 105, which are sequentially stacked. A mask pattern 218 having an opening 219 is formed on the substrate 110. Using the mask pattern 218 as an ion implantation mask, an element ion implantation process is performed. Therefore, an element implantation region 220 is formed in the semiconductor substrate 100. An element used in the element ion implantation process includes at least one of oxygen and nitrogen.

Using the mask pattern 218 as an ion implantation mask, a plurality of element ion implantation process having respectively different implantation energies is sequentially performed. Therefore, a plurality of element implantation regions 220 in the semiconductor substrate 100 may be stacked in a direction perpendicular to the top surface of the semiconductor substrate 100.

Then, the mask pattern 218 is removed, and an annealing process is performed on the substrate 110. The element implantation regions 220 are formed of the reflectors 220a of FIG. 9 through the annealing process. As illustrated in the first embodiment of the present invention, the annealing process may be replaced with another annealing process that can be performed on the substrate 110.

The semiconductor layer 105 is patterned to form the grating coupler 115 of FIG. 9. Because the method of forming the grating coupler 115 is described with reference to FIG. 5B, its overlapping description is omitted for conciseness. The process of forming the reflector 220a may be performed before or after the process of forming the grating coupler 115.

Figure 15:
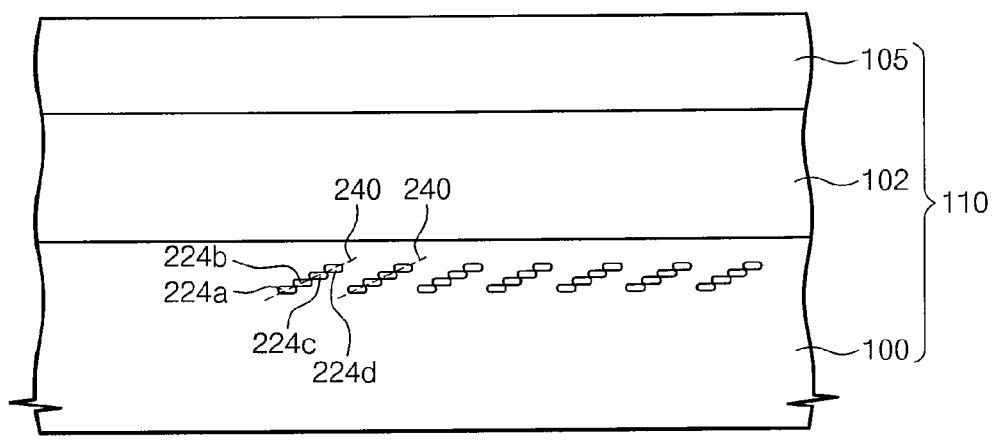
FIG. 15 is a sectional view illustrating a method of forming a semiconductor integrated circuit of FIG. 10.

FIG. 15 is a sectional view illustrating a method of forming a semiconductor integrated circuit of FIG. 10.

Referring to FIG. 15, prepared is a substrate 100 including a semiconductor substrate 100, a cladding layer 102, and a semiconductor layer 105, which are sequentially stacked. A plurality of selective element ion implantation processes having respectively different elements is sequentially performed to form stacked element implantation regions 224a, 224b, 224c, and 224d in the semiconductor substrate 100. The selective element ion implantation process can implant at least one of oxygen and nitrogen. The element implantation regions 224a, 224b, 224c, and 224d may have the same width. The element implantation regions 224a, 224b, 224c, and 224d are arranged oblique to the top surface of the semiconductor substrate 100. A virtual line 240 via the centers of the element implantation regions 224a to 224d is oblique to the top surface of the semiconductor substrate 100.

The stacked element implantation regions 224a, 224b, 224c, and 224d may constitute an element implantation region group. A plurality of element implantation region groups is arranged and spaced apart from each other in the semiconductor substrate 110 along one direction parallel to the top surface of the semiconductor substrate 100. The element implantation region groups are disposed at the same height.

An annealing process is performed on the substrate 110. Accordingly, the reflectors 225 of FIG. 10 are formed. The annealing process is replaced with another annealing process that can be performed on the substrate 110.

The semiconductor layer 105 is patterned to form the grating coupler 115 of FIG. 10. The process of forming the reflectors 225 may be performed before or after the process of forming the grating coupler 115.

Figure 16:
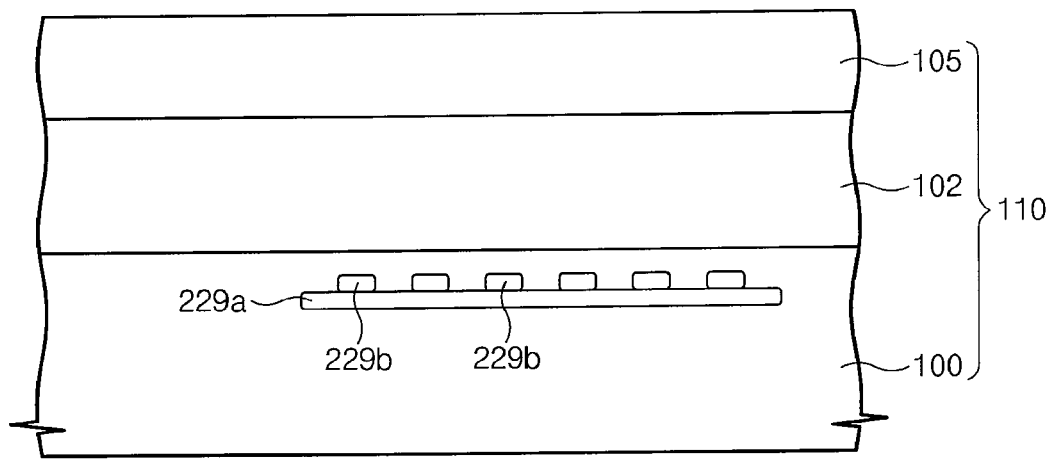
FIG. 16 is a sectional view illustrating a method of forming a semiconductor integrated circuit of FIG. 11.

FIG. 16 is a sectional view illustrating a method of forming a semiconductor integrated circuit of FIG. 11.

Referring to FIG. 16, a first mask pattern having a first opening is formed on a substrate 110 including a semiconductor substrate 100, a cladding layer 102, and a semiconductor layer 105. Using the first mask pattern as an ion implantation mask, an element ion implantation process of a first implantation energy is performed to form a first element implantation region 229a in the semiconductor substrate 100. The first element implantation region 229a has a plane shape.

Next, the first mask pattern is removed, and a second mask pattern having a plurality of second openings is formed on the substrate 110. Using the second mask pattern as an ion implantation mask, an element ion implantation process of a second implantation energy is performed to form a plurality of second element implantation regions 229b on the first element implantation region 229a. The second implantation energy is less than the first implantation energy. Next, the second mask pattern is removed.

An annealing process is performed on the substrate 110 having the first and second element implantation regions 129a and 129b to form the reflector 230 of FIG. 11. The annealing process can be replaced with another annealing process that can be performed on the substrate 110. Element ion implantation processes of the first and second implantation energies can implant at least one of oxygen and nitrogen.

The semiconductor layer 106 is patterned to form the grating coupler 115 of FIG. 11. The process of forming the reflector 230 is performed before or after the process of forming the grating coupler 115.

Figure 17:
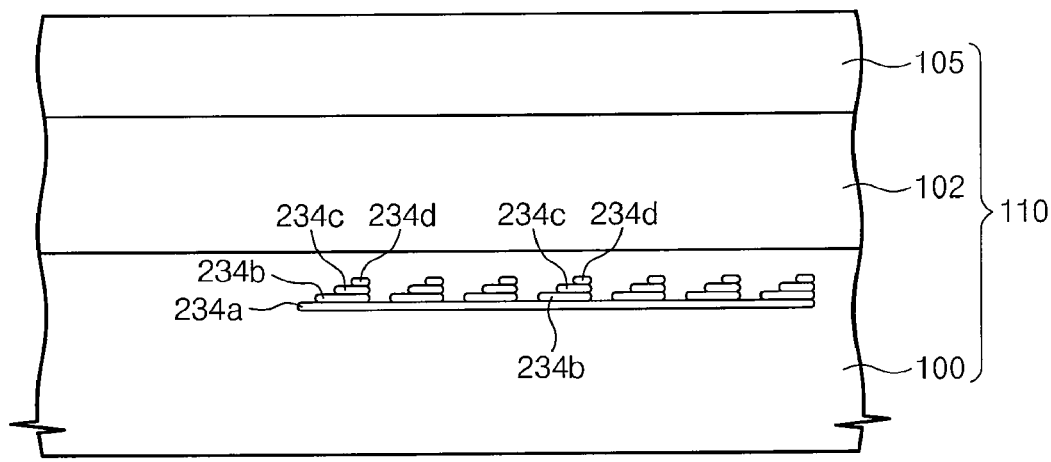
FIG. 17 is a sectional view illustrating a method of forming a semiconductor integrated circuit of FIG. 12.

FIG. 17 is a sectional view illustrating a method of forming a semiconductor integrated circuit of FIG. 12.

Referring to FIG. 17, a plurality of selective element ion implantation processes having respectively different energies is sequentially performed on the substrate 110 to form sequentially stacked element implantation regions 234a, 234b, 234c, and 234d in the semiconductor substrate 100. The sequentially stacked element implantation regions 234a, 234b, 234c, and 234d may constitute one element implantation region group. The element implantation region groups, which are arranged in one direction parallel to the top surface of the semiconductor substrate 110, are formed in the semiconductor substrate 100. At this point, the element implantation regions 234a, i.e., the lowest layer of the element implantation region groups, are connected to the each other.

The widths of the stacked element implantation regions 234a, 234b, 234c, and 234d are different from each other. The widths of the stacked element implantation regions 234a, 234b, 234c, and 234d are decreased as it approaches the upper direction. At this point, at least one sidewalls of the stacked element implantation regions 234b, 234c, and 234d on the lowest element implantation region 234a may be arranged each other. Accordingly, the other sidewalls of the element implantation regions 234b to 234d may have a stepped form.

An annealing process is performed on the substrate 110 having the element implantation regions 234a, 234b, 234c, and 234d to form the reflector 235 of FIG. 12. The annealing process is replaced with another annealing process that can be performed on the substrate 110. The semiconductor layer 105 is patterned to form the grating coupler 115 of FIG. 12. The process of forming the reflectors 235 is performed before or after the process of forming the grating coupler 115.

Figure 18A:
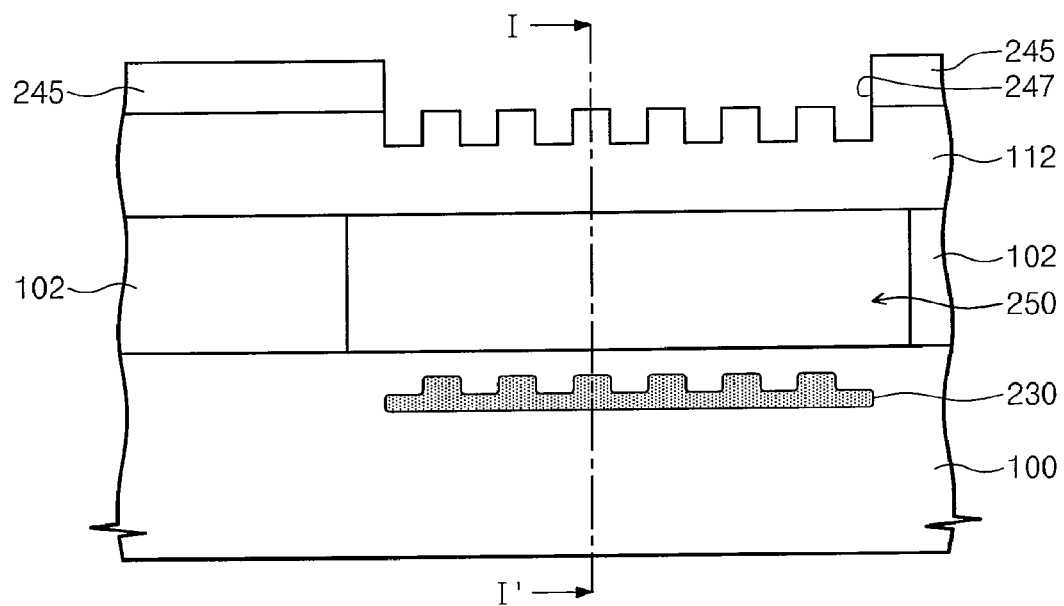
FIG. 18A is a sectional view illustrating a method of forming a semiconductor integrated circuit of FIG. 13.
Figure 18B:
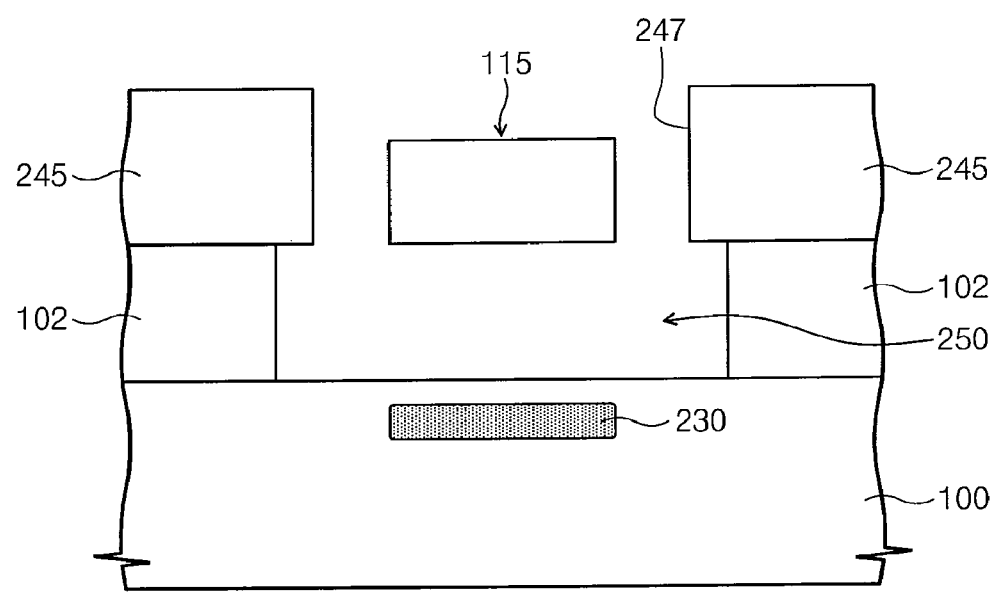
FIG. 18B is a sectional view taken along line I-I' of FIG. 18A.

FIG. 18A is a sectional view illustrating a method of forming a semiconductor integrated circuit of FIG. 13. FIG. 18B is a sectional view taken along line I-I' of FIG. 18A.

Referring to FIGS. 18A and 18B, after forming a reflector 230 and a grating coupler 115, an etching mask pattern 245 is formed on the entire surface of the semiconductor substrate 100. The etching mask pattern 245 has an opening 247. The opening 247 crosses over the grating coupler 115. The opening 247 exposes the cladding layer 102 adjacent to both sides of the grating 113. The opening 247 exposes the grating 113.

Using the etching mask pattern 245 as a mask, the cladding layer 102 is isotropically etched. At this point, the cladding layer 102 below the grating 113 is removed. Next, the etching mask pattern 245 is removed. The region 250 where the cladding layer 102 is removed is filled with the low refractive-index material 255 of FIG. 13. For example, the low refractive-index material 255 may include at least one of nitride, oxynitride and air. Alternatively, the low reflactive-index material 255 may include another material except nitride, oxynitride and air. Therefore, the semiconductor integrated circuit of FIG. 13 can be realized.

The method of FIG. 14, the method of FIG. 15, the method of FIG. 16, the method of FIG. 17, and method of FIGS. 18A and 18B can be combined to realize the semiconductor integrated circuit of the present invention.

Third Embodiment

According to this embodiment, provided is another method of improving an optical coupling efficiency. Like reference numerals refer to like elements throughout.

FIGS. 19 through 23 are sectional views illustrating a method of forming a semiconductor integrated circuit including a grating coupler according to further another embodiment of the present invention.

Figure 19:
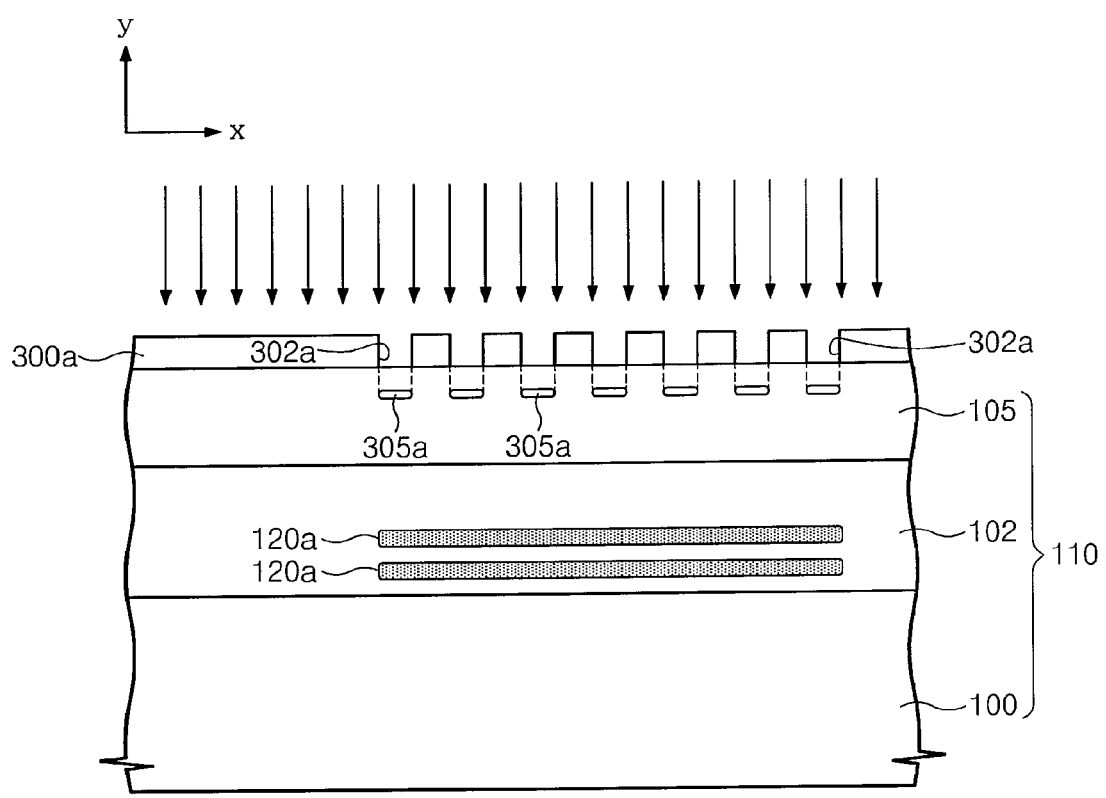
FIGS. 19 through 23 are sectional views illustrating a method of forming a semiconductor integrated circuit including a grating coupler according to further another embodiment of the present invention.

Referring to FIG. 19, a first mask pattern 302a is formed on a substrate 110 including a semiconductor substrate 100, a cladding layer 102, and a semiconductor layer 105, which are sequentially stacked. The first mask pattern 300a includes a plurality of first openings 302a. The first openings 302a have the first widths. The first openings 302a are arranged and spaced apart from each other along one direction parallel to the top surface of the semiconductor substrate 100.

Using the first mask pattern 300a as an ion implantation mask, an ion implantation process of a first implantation energy is performed to form a plurality of first compound element implantation regions 305a on the upper portion of the semiconductor layer 105. The first compound element implantation regions 305a are arranged along the one direction. The ion implantation process of the first implantation energy can implant at least one of oxygen, nitrogen, boron, phosphorus, and arsenic. Accordingly, the first compound element implantation region 305a includes at least one of oxygen, nitrogen, boron, phosphorus, and arsenic.

Before forming the first compound element implantation regions 305a, at least one reflector 120a is formed in the cladding layer 102. The reflector 120a may be replaced with other reflectors 125, 130, 135, 220a, 225, 230, and 235 according to the first and second embodiments. Unlike this, a plurality of reflectors also can be formed using at least one of the reflectors 120a, 125, 130, 135, 220a, 225, 230, and 235.

Figure 20:
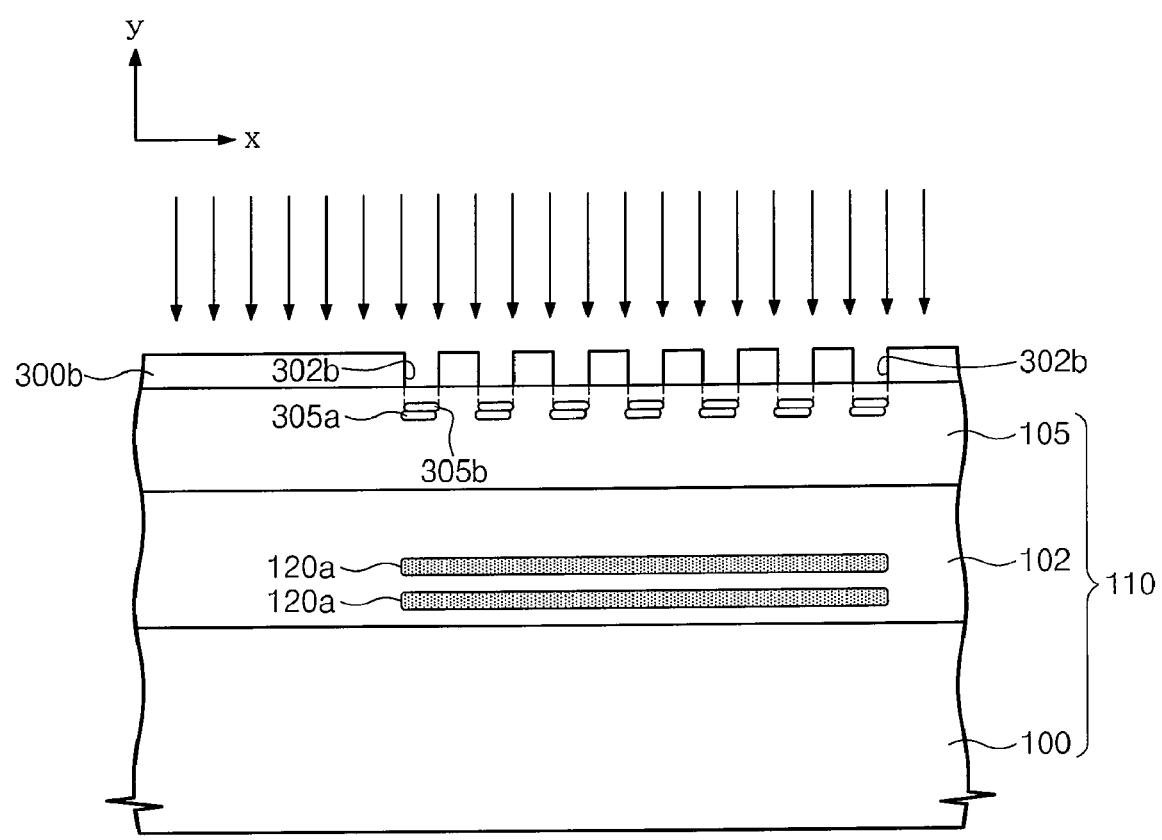

Referring to FIG. 20, the first mask pattern 300a is removed, and a second mask pattern 300b having a plurality of second openings 302b is formed on the substrate 110. The second openings 302b are respectively formed on the positions, each of which is spaced a first separation distance apart from the positions where the first openings 302a are formed along in one direction. The second openings 302b have the second width. The second width is identical to the first width.

Using the second mask pattern 300b as an ion implantation mask, an ion implantation process of a second implantation energy is performed to form a second compound element implantation region 305b on the first compound element implantation region 305a. The second implantation energy is less than the fist implantation energy. The ion implantation process of the second implantation energy can implant ions identical to those of the ion implantation process of the first implantation energy. Due to the first and second openings 302a and 302b, the width of the first compound element implantation region 305a and the width of the second compound element implantation region 305b are the same.

Figure 21:
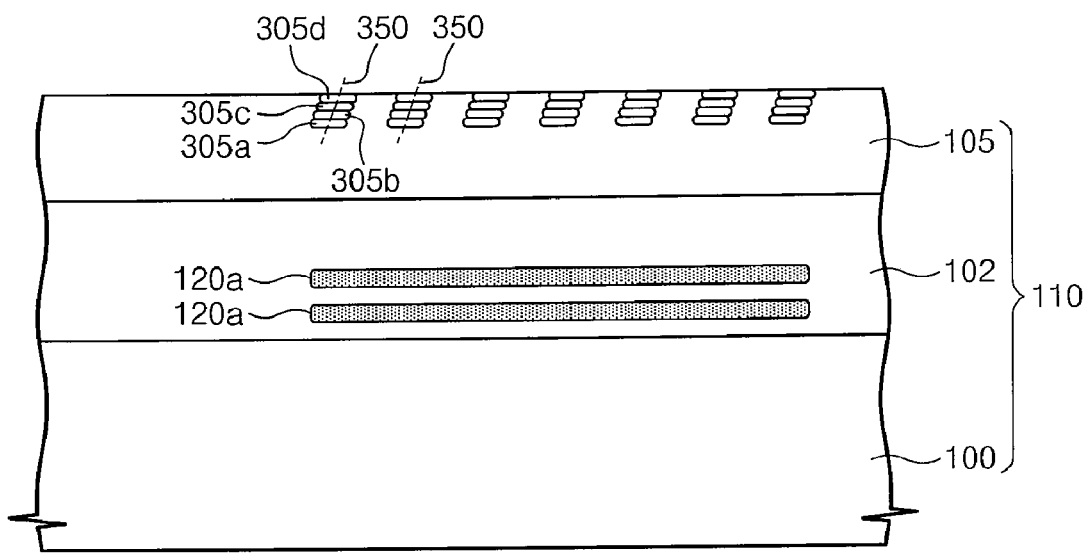

Referring to FIG. 21, the second mask pattern is removed. Next, a selective ion implantation process is performed through the third mask pattern with third openings and an ion implantation process of a third implantation energy. Therefore, third compound element implantation regions 305c are formed in the semiconductor layer 105. The third implantation energy is less than the second implantation energy. The third openings are respectively formed on the positions, each of which is spaced a second separation distance apart from the positions where the second openings are formed along the one direction. The second separation distance may be identical to the first separation distance. The third widths of the third openings may be identical to the first and second widths. The compound elements implanted in the third compound element implantation region 305c may be the same as the elements implanted in the first and second compound element layers 305a and 305b.

A selective ion implantation process is performed through a fourth mask pattern with fourth openings and an ion implantation process of a fourth implantation energy. Therefore, fourth compound element implantation regions 305d are formed in the semiconductor layer 105. The fourth implantation energy is less than the third implantation energy. The fourth openings are respectively formed on the positions, each of which is spaced a third separation distance apart from the positions where the third openings are formed along the one direction. The third separation distance may be identical to the second separation distance. The fourth widths of the fourth openings may be identical to the first to third widths. The compound elements in the fourth element implantation region 305d may be the same as the first to third compound element implantation regions 305a, 305b, and 305c. Among the compound element implantation regions 305a, 305b, 305c, and 305d, the compound element implantation region 305d, i.e., the uppermost layer, may have the top surface identical to that of the semiconductor layer 105.

The stacked compound element implantation regions 305a, 305b, 305c, and 305d may have the same widths. A virtual line 350 via the centers of the stacked compound element implantation regions 305a, 305b, 305c, and 305d may be oblique to the top surface of the semiconductor substrate 100. Accordingly, both sidewalls at the element implantation region group including the stacked compound element implantation regions 305a, 305b, 305c, and 305d may be oblique to the top surface of the semiconductor substrate 100.

Figure 22:
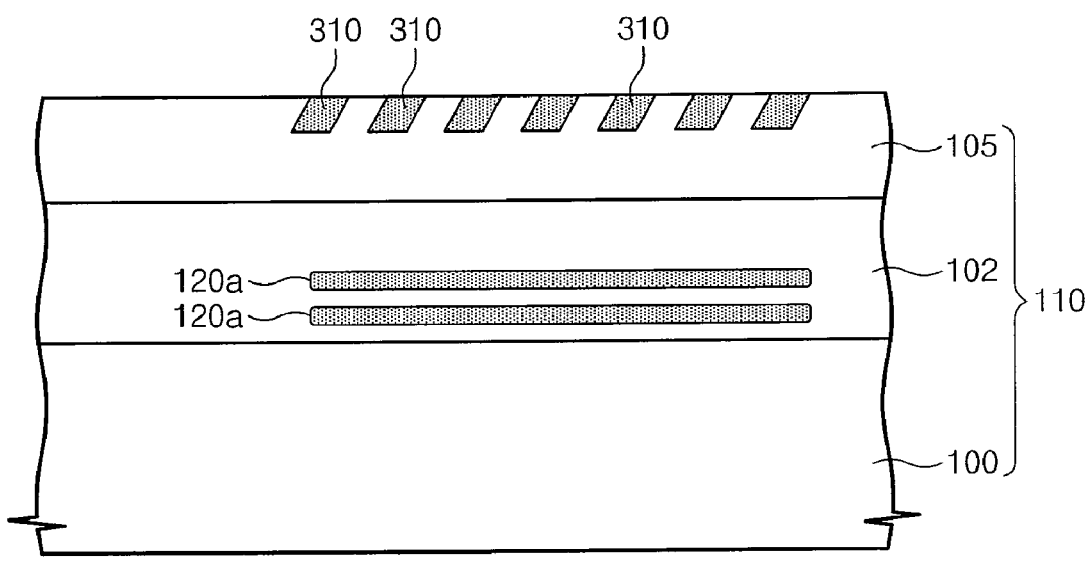

Referring to FIG. 22, an annealing process is performed on the substrate 110. Therefore, the stacked compound element implantation regions 305a, 305b, 305c, and 305d have a compound pattern 310. Both sidewalls of the compound pattern 310 are oblique to the top surface of the semiconductor substrate 100. The compound pattern 310 may be formed of an oxide, an oxide nitride, or a nitride. A plurality of compound patterns 310 is spaced apart from each other along the one direction at the upper portion of the semiconductor layer 105. At this point, a portion of the semiconductor layer 105 between adjacent compound patterns 310 corresponds to the protrusion of the grating. The protrusion of the grating has oblique sidewalls because of the oblique sidewalls of the compound patterns 310.

Figure 23:
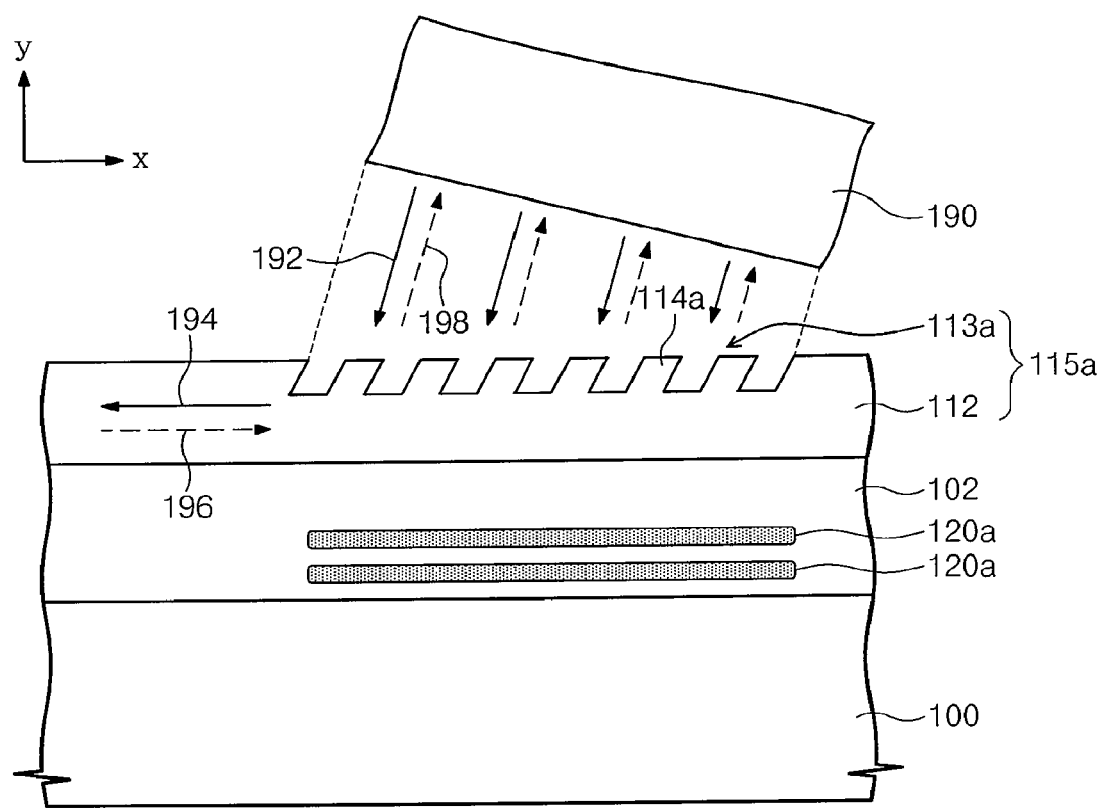

Referring to FIG. 23, the compound patterns 310 are removed to form the grating 113. The semiconductor layer 105 is patterned to form the grating coupler 115a. The grating coupler 115a includes an optical waveguide 112 and a grating 113a disposed on the optical waveguide 112. The grating 113a includes protrusions 114a having a plurality of oblique sidewalls. Protrusions 114a of the grating 113a is oblique with respect to the top surface of the semiconductor substrate 100, such that a coupling efficiency of the grating coupler 115a increases. As described above, after forming the grating 113a on the semiconductor layer 105, the optical waveguide 112 is formed. On the contrary, after forming the optical waveguide 112, the compound patterns 310 can be formed on the upper portion of the optical waveguide 112 to form the grating 113a.

The upper cladding layer 117 of FIG. 1 is formed on the grating coupler 115a. In this case, a process of removing the compound pattern 310 can be omitted. That is, when the compound pattern 310 includes the same material as the upper cladding layer 117, a process of removing the compound pattern 310 can be omitted.

The methods of forming the semiconductor integrated circuit according to the first and second embodiments may include the method of forming the grating coupler 115a with the grating 113a. That is, among the methods of forming the semiconductor integrated circuit according to the first and second embodiments, the methods of forming the grating coupler 115 may be replaced with the method of forming the grating coupler 115a of the third embodiment.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A semiconductor integrated circuit comprising:
a cladding layer disposed over a semiconductor substrate;
a grating coupler including an optical waveguide over the cladding layer and a grating over the optical waveguide; and
a first reflector formed in the cladding layer below the grating and the waveguide,
wherein the first reflector comprises a reflective surface oblique with respect to a top surface of the semiconductor substrate, and configured to redirect optical signals from the optical waveguide back to the optical waveguide.

2. The semiconductor integrated circuit of claim 1, the semiconductor integrated circuit further comprising a second reflector,
wherein the first and the second reflectors are disposed in the cladding layer, and
wherein the first and the second reflectors are arranged along a direction parallel to the top surface of the semiconductor substrate at the same height.

3. A semiconductor integrated circuit comprising:
a cladding layer disposed over a semiconductor substrate;
a grating coupler including an optical waveguide over the cladding layer and a grating over the optical waveguide; and
a first reflector formed in the cladding layer below the grating,
wherein the first reflector comprises a reflective surface oblique with respect to a top surface of the semiconductor substrate, and
wherein a thickness of the first reflector increases as a position in the first reflector moves laterally from a first sidewall of the first reflector toward a second sidewall of the first reflector.

* * * * *